US012074842B2

(12) United States Patent
Kras

(10) Patent No.: US 12,074,842 B2
(45) Date of Patent: Aug. 27, 2024

(54) SYSTEMS AND METHODS FOR COMMUNICATION WITH A THIRD-PARTY EMAIL CLIENT PLUG-IN

(71) Applicant: KnowBe4, Inc., Clearwater, FL (US)

(72) Inventor: Greg Kras, Dunedin, FL (US)

(73) Assignee: KnowBe4, Inc.

( * ) Notice: Subject to any disclaimer, the term of this patent is extended or adjusted under 35 U.S.C. 154(b) by 241 days.

(21) Appl. No.: 17/844,569

(22) Filed: Jun. 20, 2022

(65) Prior Publication Data
US 2022/0321520 A1 Oct. 6, 2022

Related U.S. Application Data

(63) Continuation of application No. 17/168,809, filed on Feb. 5, 2021, now Pat. No. 11,381,541.

(60) Provisional application No. 62/971,302, filed on Feb. 7, 2020.

(51) Int. Cl.
| | | |
|---|---|---|
| *H04L 9/08* | (2006.01) | |
| *H04L 51/212* | (2022.01) | |
| *H04L 51/42* | (2022.01) | |
| *H04L 67/02* | (2022.01) | |
| *H04L 69/22* | (2022.01) | |

(52) U.S. Cl.
CPC .............. *H04L 51/42* (2022.05); *H04L 9/083* (2013.01); *H04L 51/212* (2022.05); *H04L 67/02* (2013.01); *H04L 69/22* (2013.01)

(58) Field of Classification Search
CPC ................................. H04L 51/18; H04L 69/22
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

Final Office Action on U.S. Appl. No. 17/168,809 DTD Aug. 2, 2021.

(Continued)

*Primary Examiner* — Caroline H Jahnige
(74) *Attorney, Agent, or Firm* — Foley & Lardner LLP

(57) ABSTRACT

Systems and methods are described for communication of a third-party application server with a third-party email client plug-in. The systems and the methods enable the third-party application server to provide a plug-in header contained in a message. The plug-in header may include an X-header. The X-header may be injected into the message. The plug-in installed within an email client receives the message. The plug-in is configured to process the plug-in header to identify one or more instructions to perform an action of one or more actions. The one or more instructions may relate to a property of a user and/or a property of the email client of the user. Responsive to the one or more instructions, the plug-in performs the action.

20 Claims, 17 Drawing Sheets

(56) References Cited

U.S. PATENT DOCUMENTS

| | | |
|---|---|---|
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,876,753 B1 | 1/2018 | Hawthorn |
| 9,912,687 B1 | 3/2018 | Wescoe et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2007/0011258 A1* | 1/2007 | Khoo ............... G06F 3/0482 709/206 |
| 2007/0260693 A1 | 11/2007 | Cardone et al. |
| 2008/0294726 A1 | 11/2008 | Sidman |
| 2009/0198997 A1* | 8/2009 | Yeap ................ H04L 51/48 380/282 |
| 2010/0106784 A1* | 4/2010 | Wang ................ G06F 8/60 709/206 |
| 2015/0229593 A1* | 8/2015 | Parker ............... H03M 7/00 709/206 |
| 2016/0164898 A1 | 6/2016 | Belani et al. |
| 2016/0301705 A1 | 10/2016 | Higbee et al. |
| 2018/0191640 A1 | 7/2018 | Calderon et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0007502 A1 | 1/2020 | Everton |
| 2020/0311260 A1 | 10/2020 | Klonowski et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Non-Final Office Action on U.S. Appl. No. 17/168,809 DTD Apr. 15, 2021.

Notice of Allowance on U.S. Appl. No. 17/168,809 DTD May 11, 2022.

US Office Action on U.S. Appl. No. 17/168,809 DTD Jan. 31, 2022.

US office Action on U.S. Appl. No. 17/168,809 DTD Aug. 2, 2021.

* cited by examiner

MIME-Version: 1.0
From: Alice Sender <ASender@This-Host.This-net>
Date: Mon, 11 Feb 2019 16:40:04 +0530
Subject: "Team Meeting Tomorrow"
Message-ID: [alphanumeric ID]

Content-Transfer-Encoding: 7bit
Content-Description: very simple MIME message
Content-ID: current-update@Third-party-application-server.com
Content-Location: 248439/248446
Content-Disposition: inline
Content-Type: plugin/channel; boundary="Instructions"

- - Instructions
Content-Type: text/plain

*Third-party email client plug-in Instructions*

Content-Type: text/plain
Content-Disposition: attachment;
 filename="batch.exe"

*Attached Third-party email client plug-in batch file*

- - Instructions - -

Content-Transfer-Encoding: 7bit
Content-Type: text/plain; charset=ascii
Body-plain: "Dear Bob
Please be advised that we have a team meeting tomorrow, and it is your turn to bring donuts.

FIG. 6B

SYSTEMS AND METHODS FOR COMMUNICATION WITH A THIRD-PARTY EMAIL CLIENT PLUG-IN

CROSS-REFERENCE TO RELATED APPLICATION

This application claims priority to and the benefit of U.S. patent application Ser. No. 17/168,809, titled "SYSTEMS AND METHODS FOR COMMUNICATION WITH A THIRD-PARTY EMAIL CLIENT PLUG-IN" and filed on Aug. 12, 2021, which claims priority to and the benefit of U.S. Patent Application No. 62/971,302, titled "SYSTEMS AND METHODS FOR COMMUNICATION WITH A THIRD-PARTY EMAIL CLIENT PLUG-IN" and filed on Feb. 7, 2020, the contents of all of which are hereby incorporated herein by reference in its entirety for all purposes.

TECHNICAL FIELD

The present disclosure generally relates to systems and methods for facilitating communication between a third-party application server and a third-party email client plug-in installed on an email client. The systems and methods further relate to actions performed by the third-party email client plug-in in response to communication received from the third-party application server.

BACKGROUND

Email clients provide a host of functionalities to support users. For custom function requirements that may not be catered by existing email client functionalities, the email clients provide options to add custom functions. One of the options that an email client provides to add custom functions and/or to expand capabilities is to allow executables of custom codes to run as a part of the email client. Such executables may be known as a plug-in, a connector, add-on, add-in and the like (hereinafter referred to as a plug-in). The plug-ins may be provided by third-party application vendors. Plug-ins may provide an option to include a plethora of custom functionalities to be added to the email client, enabling customization and providing an enhanced user experience.

The plug-ins have some limitations that may prevent them from operating optimally. One of the limitations is lack of access for a third-party application vendor (for example, via a third-party application server) to the plug-in (also interchangeably referred to as third-party email client plug-in) installed in the email client. Once the third-party email client plug-in is installed in the email client, the third-party application vendor may have a limited or no access to the third-party email client plug-in. Limited or lack of access may adversely affect the ability of the third-party application vendor to optimally manage the plug-in. As a result, the third-party application vendor may not be able to communicate with the plug-in to manage configuration or to initiate software update of the plug-in, for example, to change settings or to apply a patch. Consequently, the plug-in may not function optimally. In an example, if there is a software update for the plug-in available (for example on the vendor's cloud storage), the third-party email client plug-in may not be aware of the update or may require a notification to schedule the software update. With the third-party application vendor lacking access to the third-party email client plug-in, the third-party application vendor may not be able to communicate any notifications and/or code to update the software. Consequently, the third-party email client plug-in may not get an update at a desired time.

Another limitation is that the third-party email client plug-ins may become orphaned agents. The orphaned agents may be defunct plug-ins that are present in the email client but do not perform their intended functions. The plug-ins become orphaned agents for various reasons. In some instances, the orphaned agents may create large log files. These log files may unnecessarily consume memory space. In some instances, memory consumption may become large, thus hindering the functioning of the email client. Further, system or application errors occur when a kernel driver becomes incompatible with the orphaned agents. In these instances, the plug-ins may need to be re-associated with the third-party application server.

Yet another limitation arises from situations where the plug-in may need to communicate with the third-party application server or an external server, to provide required functionality. For example, the third-party email client plug-in may need to communicate with the third-party application server to obtain information to enable its service, to retrieve information associated with an email sender or an email recipient, and the like. In situations where the email client is offline or there is lack of internet connectivity, the third-party email client plug-in may not be able to communicate with the third-party application server, and thus may not be able to provide the functionality as required. Thus, current systems are not supportive to enable the third-party email client plug-in to function optimally.

SUMMARY

Systems and methods are provided for communication with a third-party email client plug-in. In an example embodiment, a method is described which includes, receiving, by a plug-in installed within an email client, from the email client, a plug-in header contained in a message; identifying, by the plug-in, one or more instructions to instruct the plug-in to perform an action of one or more actions; and performing, by the plug-in responsive to the one or more instructions, the action.

In some implementations, the plug-in header comprises one or more X-headers.

In some implementations, the one or more instructions to instruct the plug-in to perform the action are included in a message in a way that is not visible to a recipient of the message.

In some implementations, the plug-in header is injected into the message responsive to a third-party server providing instructions to an email server that communicates the message to the email client.

In some implementations, the plug-in header provides a pointer to a lookup element in a server.

In some implementations, the lookup element identifies content for the plug-in to use in performing the action.

In some implementations, the lookup element identifies the one or more instructions.

In some implementations, the one or more instructions relate to a property of a user.

In some implementations, the one or more instructions relate to a property of the email client of the user.

In some implementations, the method further comprises causing the action to be performed based at least on the property of the user.

In some implementations, the method further comprises decrypting, by the plug-in, the plug-in header using a key shared with a third-party server distinct from the email server.

In another example embodiment, a system is described comprising: a plug-in installed within an email client that is configured to receive, from the email client, a plug-in header contained in a message wherein the plug-in is configured to: identify, from the plug-in header, one or more instructions to instruct the plug-in to perform an action of the one or more actions; and perform, by the plug-in responsive to the one or more instructions, the action.

In some implementations, the plug-in header comprises one or more X-headers.

In some implementations, the plug-in header comprises a control message.

In some implementations, the plug-in header is configured to provide a pointer to a lookup element in a server.

In some implementations, the lookup element identifies content for the plug-in to use in performing the action of the one or more actions.

In some implementations, the lookup element identifies the one or more instructions.

In some implementations, the one or more instructions relate to a property of a user.

In some implementations, the plug-in is further configured to perform the action based at least on the property of the user.

In some implementations, the plug-in header is injected into the message responsive to a third-party server providing instructions to an email server that communicates the message to the email client on which the plug-in is installed.

In some implementations, the plug-in is further configured to decrypt the plug-in header using a key shared with a third-party server distinct from the email server.

In some implementations, the plug-in headers may be created by the third-party server.

In some implementation, the control message for the plug-in headers may be created by the third-party server and the email server may create the plug-in headers comprising the control message prior to sending the message to the email client.

In some implementation, the third-party server may inject the plug-in headers into the message prior to the email server sending the message to the email client.

In some implementation, the third-party server may inject the plug-in headers into the message prior to the email server sending the message to the email client.

In some implementations, the third-party server may inject the plug-in headers into the message as the message passes through an intermediary node on its way between the email server and the message recipient.

In a further example embodiment, a system is described comprising: a third-party server configured to communicate with a mail server and to instruct the mail server to inject into a message a control message comprising one or more instructions to perform one or more actions; a client-side plug-in installed within an email client that is configured to receive the control message from the message; wherein the client-side plug-in is configured to: identify the one or more instructions from the control message; and responsive to the one or more instructions, perform an action of the one or more actions.

In some implementations, the third-party server may encrypt the control message for the client-side plug-in using a key of a key pair, wherein the third-party server shares the corresponding key with the client-side plug-in.

In some implementations, the client-side plug-in may decrypt the control message using the key shared by the third-party server.

In some implementations, the third-party server may include the control message in a dedicated email and send the dedicated email to the mail server.

Other aspects and advantages of the present solution will become apparent from the following detailed description, taken in conjunction with the accompanying drawings, which illustrate by way of example the principles of the present solution.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 6B depicts another example of an SMTP message comprising a control message, where the control message is included in a MIME header or a MIME attachment according to some embodiments;

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for communication with a third-party email client plug-in. In particular, Section B describes systems and methods for facilitating communication between a third-party application server and a third-party email client plug-in installed on an email client.

A. Computing and Network Environment

Figure 1A:
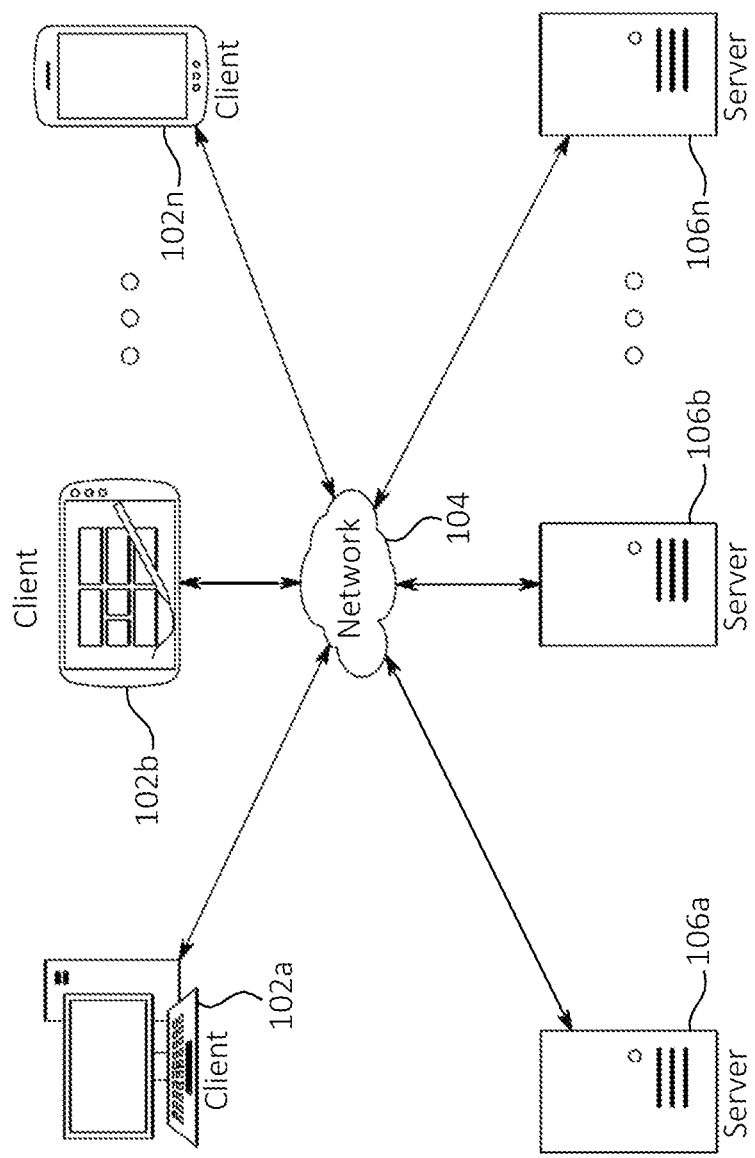
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. Network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
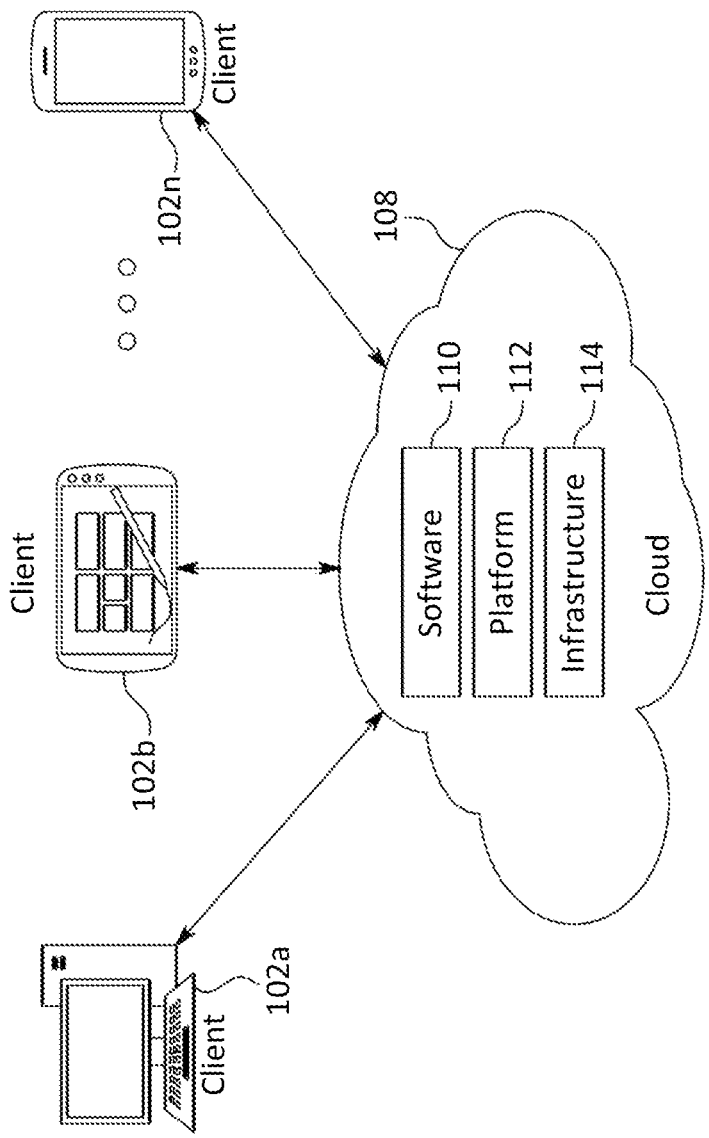
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102*a*-102*n*, in communication with Cloud 108 over one or more networks 104. Clients 102 may include, e.g., thick clients, thin clients, and zero clients. A thick client may provide at least some functionality even when disconnected from Cloud 108 or servers 106. A thin client or zero client may depend on the connection to Cloud 108 or server 106 to provide functionality. A zero client may depend on Cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
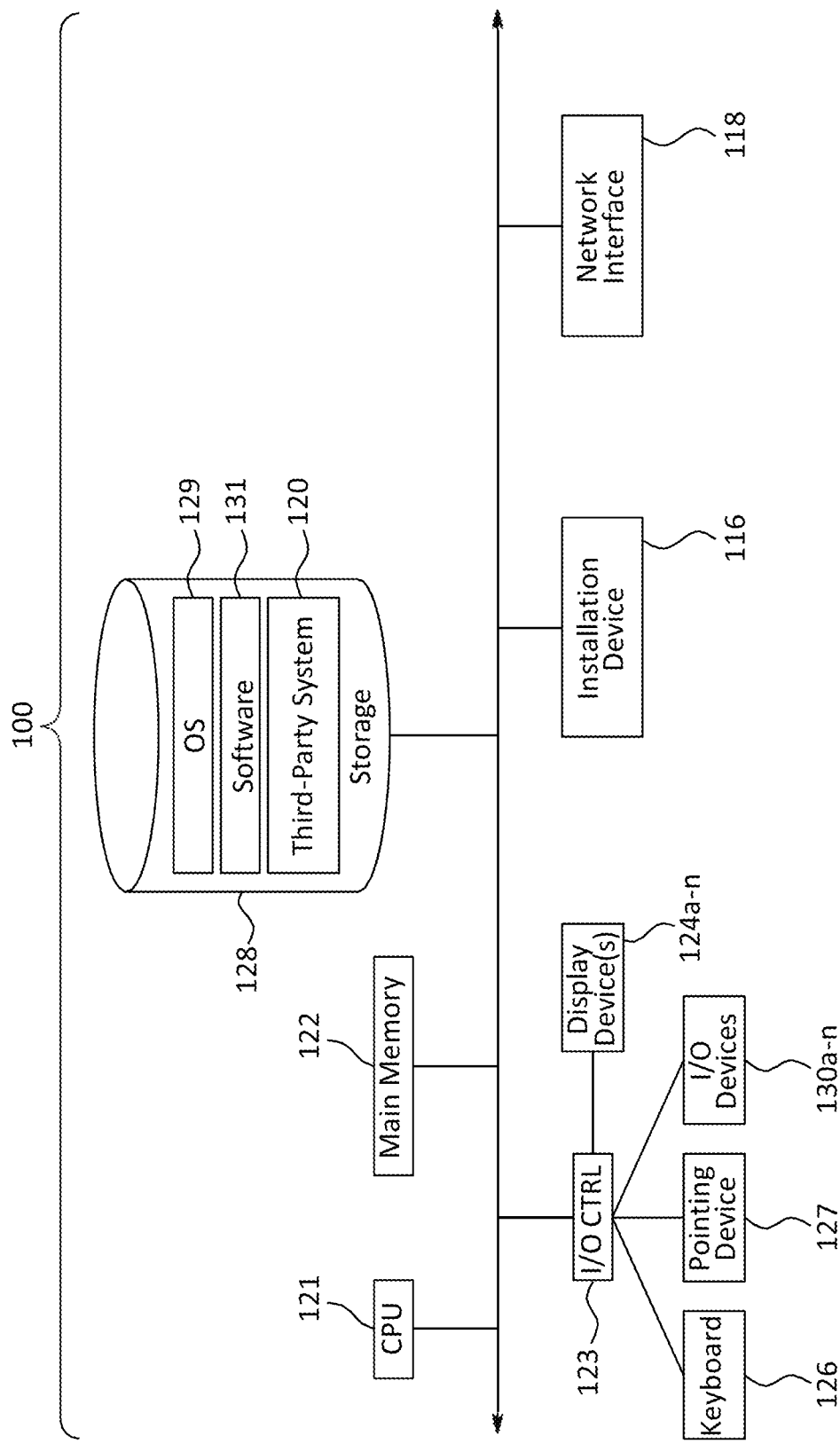
FIGS. 1C and 1D are block diagrams depicting embodiments of computing devices useful in connection with the methods and systems described herein, according to some embodiments.
Figure 1D:
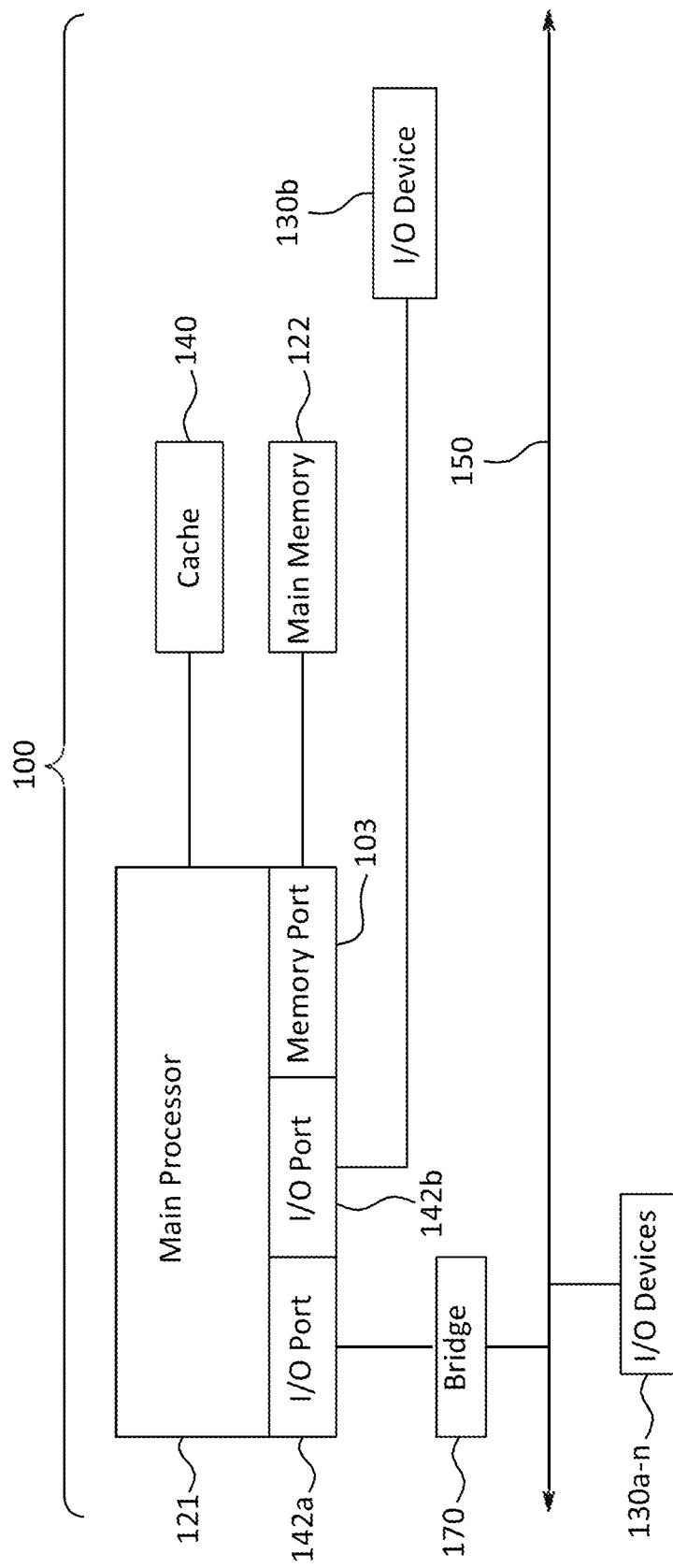

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. The storage device 128 may include, without limitation, operating system 129, software 131, and a software of a third-party system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAIVI), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with the display 124 or the I/O controller 123 for the display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for the computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to the computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to the threat dispositioning system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Washington In other embodiments, computing device 100 is an eBook reader, e.g. the KINDLE family of devices by Amazon.com, or NOOK family of devices by Barnes & Noble, Inc. of New York City, New York.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Communication with a Third-Party Email Client Plug-In The following describes systems and methods for communication with a third-party email client plug-in. In particular, systems and methods are described for facilitating communication between a third-party application server and a third-party email client plug-in installed on an email client.

The systems and the methods of the present disclosure may enable the third-party application server to configure operations at the email client and/or at the third-party email client plug-in installed on the email client. A mail server is used to send a control message from the third-party application server to the third-party email client plug-in. The mail server may include the control message in an email message and may transmit the email message to the email client. The control message may include one or more instructions for the third-party email client plug-in to perform one or more actions. The third-party email client plug-in extracts the instructions from the email message and performs one or more actions based on instructions captured in the email message. The systems and the methods may also provide for any structure of email messages to be sent to the third-party email client plug-in. Further, the actions to be performed are not limited to actions specific to the email messages themselves. The actions may also be performed on the email client or on the third-party email client plug-in itself.

In some implementations, the third-party application server may send a control message to the mail server. On receiving the control message, the mail server may embed the control message into an email and send the email comprising the control message to the email client on which the third-party email client plug-in is installed. In some implementations, the control message may be included in a specific extension header in the email. Hereon, the term "extension header" may be substituted with its abbreviated form "X-header" and these terms may be used interchangeably. An extension header (or X-header) is one type of header, and hence where appropriate, may sometimes be referred to more generally simply as a header. The third-party email client plug-in may be configured to look for the specific X-header in each email message that the third-party email client plug-in received from the mail server in addition to knowing what to do when the specific X-header is detected. This allows the third-party email client plug-in to function differently at an email-by-email granularity. Further, it shall be appreciated that an email may comprise a header section and a message body section. The header section may comprise one or more header fields, each conveying an item of information relating to the email. A number of header fields are standardized, such as "Date", "Sender", "Subject" and so forth. The use of proprietary or non-standardized header fields is also supported through the use of extension header fields beginning with "X-". The header section of an email may comprise one or more standardized (or normal) header fields and one or more extension header (X-header) fields. These may also be commonly referred to as one or more standardized (or normal) headers, and one or more extension headers (X-headers). Herein, the terms "header field" and "header" are used synonymously and are interchangeable.

In some embodiments, the systems and the methods of the present disclosure may provide a third-party application server that may send any control message to be included in the email, which is then downloaded to an email recipient's inbox when the email recipient is online. In some examples, the control message may instruct the third-party email client plug-in to retrieve one or more instructions from the third-party application server while the email recipient is online. Since, the email has already been downloaded and the email includes control message comprising instructions for third-party email client plug-in to perform actions, the third-party email client plug-in can act on the instructions even when the email recipient (user) is offline. Therefore, the third-party application server is enabled to use an email as a transport mechanism for control message signaling, thereby avoiding reliance on a separate control channel path and enabling control message signaling in offline scenarios.

Figure 2:
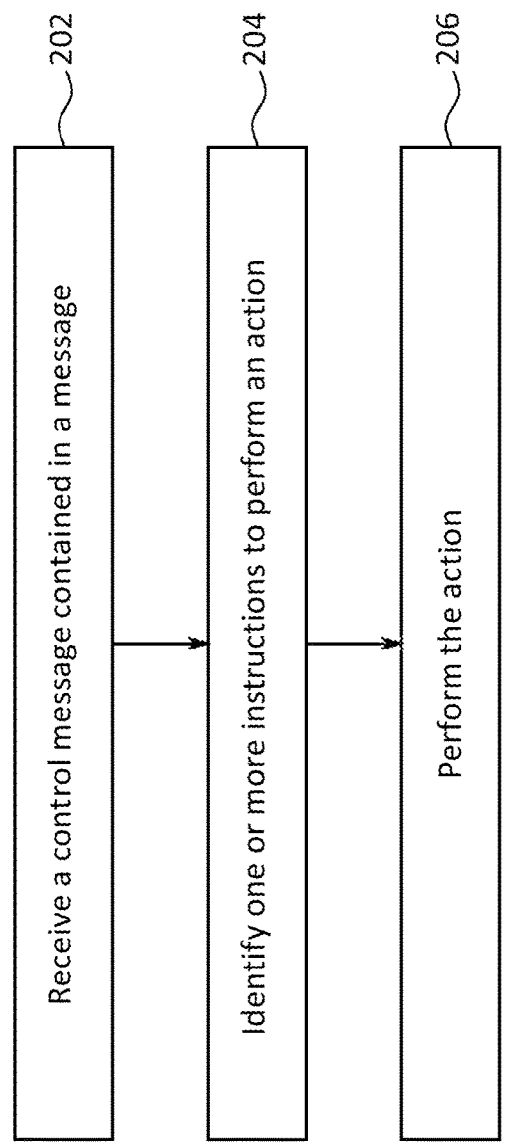
FIG. 2 depicts an implementation of a method for performing an action based on a control message included in a message, according to some embodiments.

Referring to FIG. 2, FIG. 2 depicts an implementation of a method 200 for performing an action based on a control message included in a message, according to some embodiments.

The order in which the method is described is not intended to be construed as a limitation, and any number of the described method blocks can be combined in any order to implement the method, or an alternative method.

At step 202, in some implementations, a message comprising a control message contained in a message is received. An email client may receive the control message contained in the message. The message may be an email message. In one embodiment, the control message may be placed in a header of the email message. In another embodiment, the control message may be placed in a body of the email message. In yet another embodiment, the control message may be placed in both the header and the body of the email message. In an example, the control message may include a pointer to a storage of messages. The storage of messages may be either local or remote to the email client. As a further example, the storage of messages may include a pointer to one or more specific messages within the storage of messages. In implementations, where the control message may include the pointer to a storage of messages, the control message may also provide instructions to the email client to retrieve the content while an email recipient is online. In further example embodiments, the control message may comprise the actual content itself within the header of the email message. The control message may be a directive comprising one or more instructions to a third-party email client plug-in installed in the email client. In an example, the control message may include a pointer to a lookup element in a third-party server, also referred to as third-party application server. In another example, the control message may include an executable for the third-party email client plug-in. The executable may be, for example, an update or a patch. In yet another example, the control message may include commands to access a third-party server for further instructions/steps.

At step 204, in some implementations, one or more instructions to perform an action of one or more actions are identified. The third-party email client plug-in may process the control message contained in the message to identify the one or more instructions. In one embodiment, the third-party email client plug-in may identify the one or more instructions in the control message itself. In another embodiment, the third-party email client plug-in may identify the one or more instructions at the lookup element pointed by the pointer.

At step 206, in some implementations, the action is performed. Based on the one or more instructions, the third-party email client plug-in performs the action.

Figure 3:
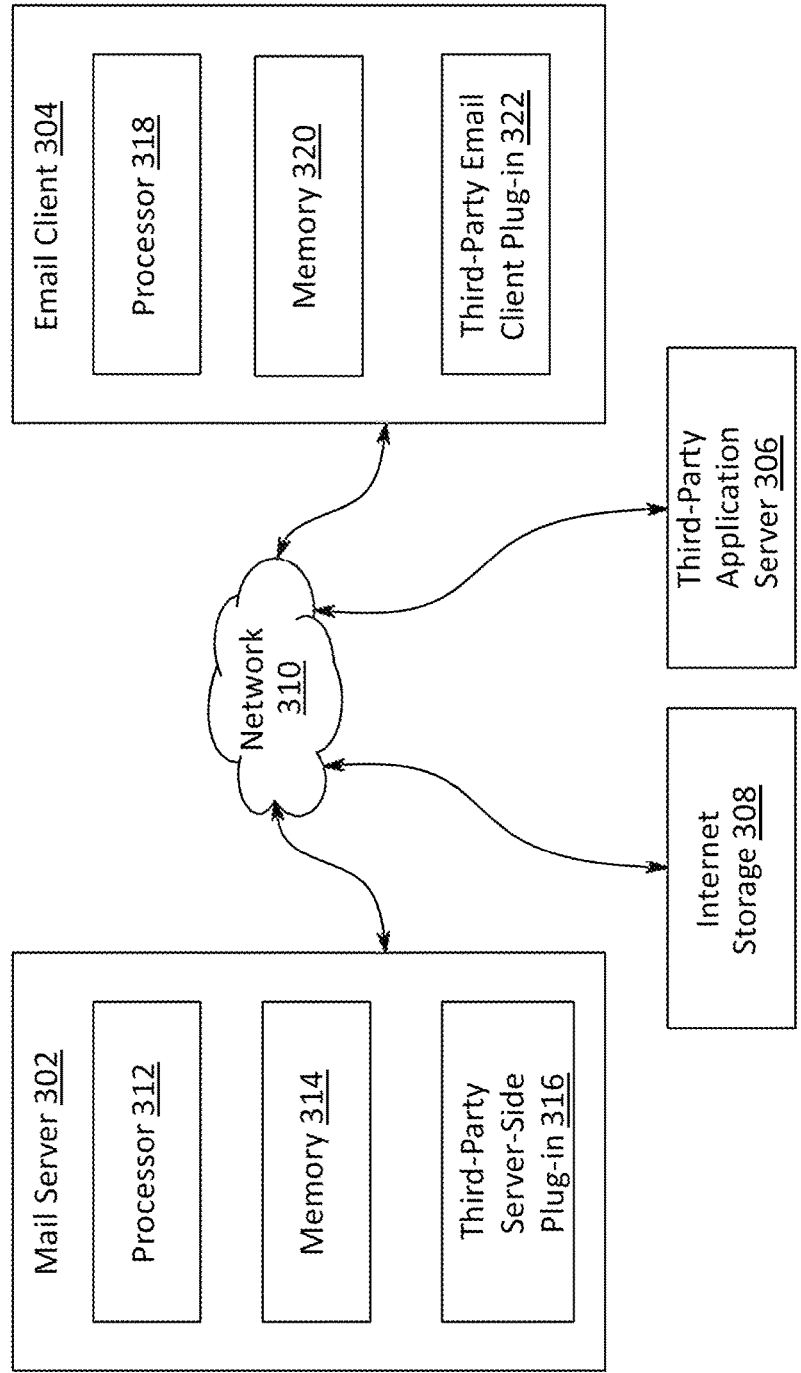
FIG. 3 depicts an implementation of some of the architecture of an implementation of a system for facilitating communication between a mail server comprising a third-party server-side plug-in and an email client comprising a third-party email client plug-in, according to some embodiments.

Referring to FIG. 3 in a general overview, FIG. 3 depicts an implementation of some of the architecture of an implementation of system 300 for communication between a mail server and an email client, according to some embodiments. System 300 may include mail server 302, email client 304, third-party application server 306, internet storage 308, and network 310 enabling communication between the system components. Mail server 302, also interchangeably referred to as email server 302, may handle and deliver email messages over network 310 to email client 304. Network 310 may be an example or instance of network 104, details of which are provided with reference to FIG. 1A and its accompanying description. Mail server 302 may include processor 312, memory 314, and third-party server-side plug-in 316. In other implementations, third-party server-side plug-in 316 may not be implemented in mail server 302 but may coordinate and communicate with mail server 302. Email client 304 may include processor 318, memory 320, and third-party email client plug-in 322. In some implementations, third-party email client plug-in 322 may not be included in email client 304 but may coordinate and communicate therewith. Third-party email client plug-in 322 may alternatively be referred to as plug-in 322 or client-side plug-in 322. In an implementation, third-party application server 306 may be configured to communicate with third-party server-side plug-in 316, third-party email client plug-in 322, and internet storage 308 over network 310. Further, third-party application server 306 may alternatively referred to as third-party server 306.

Referring now to FIG. 3 in more detail, in some embodiments, mail server 302 may be any server capable of handling and delivering email messages over network 310. In an implementation, mail server 302 may be server, such as server 106 shown in FIG. 1A. Mail server 302 may be implemented by a device, such as computing device 100 shown in FIGS. 1C and 1D. For example, processor 312 and memory 314 of mail server 302 may be CPU 121 and main memory 122 respectively as shown in FIGS. 1C and 1D. In some embodiments, mail server 302 may be implemented as a part of a cluster of servers. In some embodiments, mail server 302 may be implemented across a plurality of servers, thereby, tasks performed by mail server 302 may be performed by the plurality of servers. These tasks may be allocated among the cluster of servers by an application, a service, a daemon, a routine, or other executable logic for task allocation. Mail server 302 may exchange information with email client 304 and third-party application server 306 over network 310 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Known examples of mail server 302 include Microsoft® Exchange Server, and HCL Domino.

Referring again to FIG. 3, in some embodiments, email client 304 may be an application installed on a device, such as client device 102 shown in FIGS. 1A and 1B. For example, processor 318 and memory 320 of email client 304 may be CPU 121 and main memory 122 respectively as shown in FIGS. 1C and 1D. In some embodiments, email client 304 may be an application that could be accessed over network 310 through a browser without requiring to be installed on client device 102. In one implementation, email client 304 may be any application capable of composing, sending, receiving, and reading emails messages. For example, email client 304 may be an instance of an application, such as Microsoft Outlook application, Lotus Notes application, Apple Mail application, Gmail application, or any other known or custom email application. In an implementation, email client 304 may be configured to receive email messages from mail server 302. An email message may be interchangeably referred to as an email or a message. In an example, a user of client device 102 may select, purchase and/or download email client 304 via any application distribution platforms. Note that as used herein, the term "application" may refer to one or more applications, services, routines, or other executable logic or instructions.

Email client 304 may include third-party email client plug-in 322. An email client plug-in is an application program that may be installed in an email client for providing one or more additional features which enables customization. The email client plug-in may be provided by the same entity that provides the email client software or may be provided by a different entity. Based on usage types, email client plug-ins may be classified into different types. Such types may include for example plug-ins providing a User Interface (UI) element such as a button to trigger a function, and plug-ins that highlight portions of email to prompt a user to trigger a function. Functionality of email client plug-ins that use a UI button may be triggered when a user clicks the button while viewing an email. Some of the examples of email client plug-ins that use a button UI include but are not limited to, a Phish Alert Button (PAB) plug-in, a task create plug-in, a spam marking plug-in, an instant message plug-in and a search and highlight plug-in. The other type of email client plug-in that highlights portions of email may scan the content of the email for specific content. In response to identifying the specific content, the email client plug-in may highlight the specific content to prompt the user to trigger a function. In response to the user triggering the function, the function is executed to achieve a desired result. Examples of such email client plug-ins include a thesaurus lookup plug-in, a map plug-in, an action item creator plug-in, a meeting creator plug-in and an email alert plug-in. Consider an example of working of a map plug-in: when an email arrives, the map plug-in may analyze the content of the email to identify an address or location data in the email. In response to identifying the address or location data, the map plug-in highlights the address or location data for the attention of a user. When the user clicks on highlighted information, e.g., the address or location data, that information may be sent to a third-party map application to display the address or location on a map.

Referring to FIG. 3, third-party email client plug-in 322 may be any of the two aforementioned types or may be of any other type. In one example, third-party email client plug-in 322 may provide a button plug-in through which function or capabilities of third-party email client plug-in 322 is triggered by a user action on the button. Upon activation, third-party email client plug-in 322 may extract one or more instructions from a body and/or header of an email message for performing an action. In another example, third-party email client plug-in 322 may provide a highlighting feature. The user can click on the highlighted portions which may provide drop-down options (for example, through left or right mouse clicks) that enable the user to select and trigger a particular function or capability of third-party email client plug-in 322. Other implementations of third-party email client plug-in 322 not discussed here are contemplated herein.

Referring again to FIG. 3, in some embodiments, third-party application server 306 may host third-party applications that provide additional and/or custom features to email client 304. Third-party application server 306 may communicate with third-party server-side plug-in 316 and third-party email client plug-in 322 to provide additional and/or custom features to email client 304. In some implementations, third-party server-side plug-in 316 is provided to mail server 302 by third-party application server 306. In some implementations, third-party server-side plug-in 316 is provided to mail server 302 by another entity, for example, third-party server-side plug-in 316 may be downloaded from another server.

According to one or more embodiments, third-party application server 306 may be configured to communicate information, content, and/or instructions to third-party email client plug-in 322 through emails. Also, third-party email client plug-in 322 may be configured to identify information, content, and/or instructions from third-party application server 306 and perform one or more actions accordingly. As a result of aforementioned configurations, third-party application server 306 may be able to monitor and control functioning of third-party email client plug-in 322 including configuring, updating, changing settings, applying a patch, or performing any action on third-party email client plug-in 322. In light of above configurations, third-party application server 306 may ensure that third-party email client plug-in 322 is operating optimally and is not orphaned. In some embodiments, third-party application server 306 may dynamically control the functioning of third-party email client plug-in 322 from one email to another email.

In an implementation, the third-party application running on third-party application server 306 may communicate with third-party server-side plug-in 316 and third-party email client plug-in 322 over network 310. Third-party server-side plug-in 316 may be configured to inject a control message into an email. Third-party email client plug-in 322 may be configured to identify the control message in the email and to perform one or more actions in response to interpreting information, content, and/or one or more instructions identified in the control message.

Third-party application server 306 may be owned and/or controlled and/or managed by a third party. Further, third-party application server 306 may be a part of a cluster of servers. In some embodiments, tasks performed by third-party application server 306 may be performed by a plurality of servers. These tasks may be allocated among the cluster of servers by an application, service, daemon, routine, or other executable logic for task allocation.

Referring again to FIG. 3, system 300 may include internet storage 308. Internet storage 308 may store information that may be accessed by third-party server-side plug-in 316 and third-party email client plug-in 322. Internet storage 308 may be also be used to authenticate messages, retrieve additional content or resources, or give specific instructions to email client 304, third-party email client plug-in 322, or both. In an example, third-party email client plug-in 322 may access internet storage 308 to extract any information stored in internet storage 308.

Figure 4A:
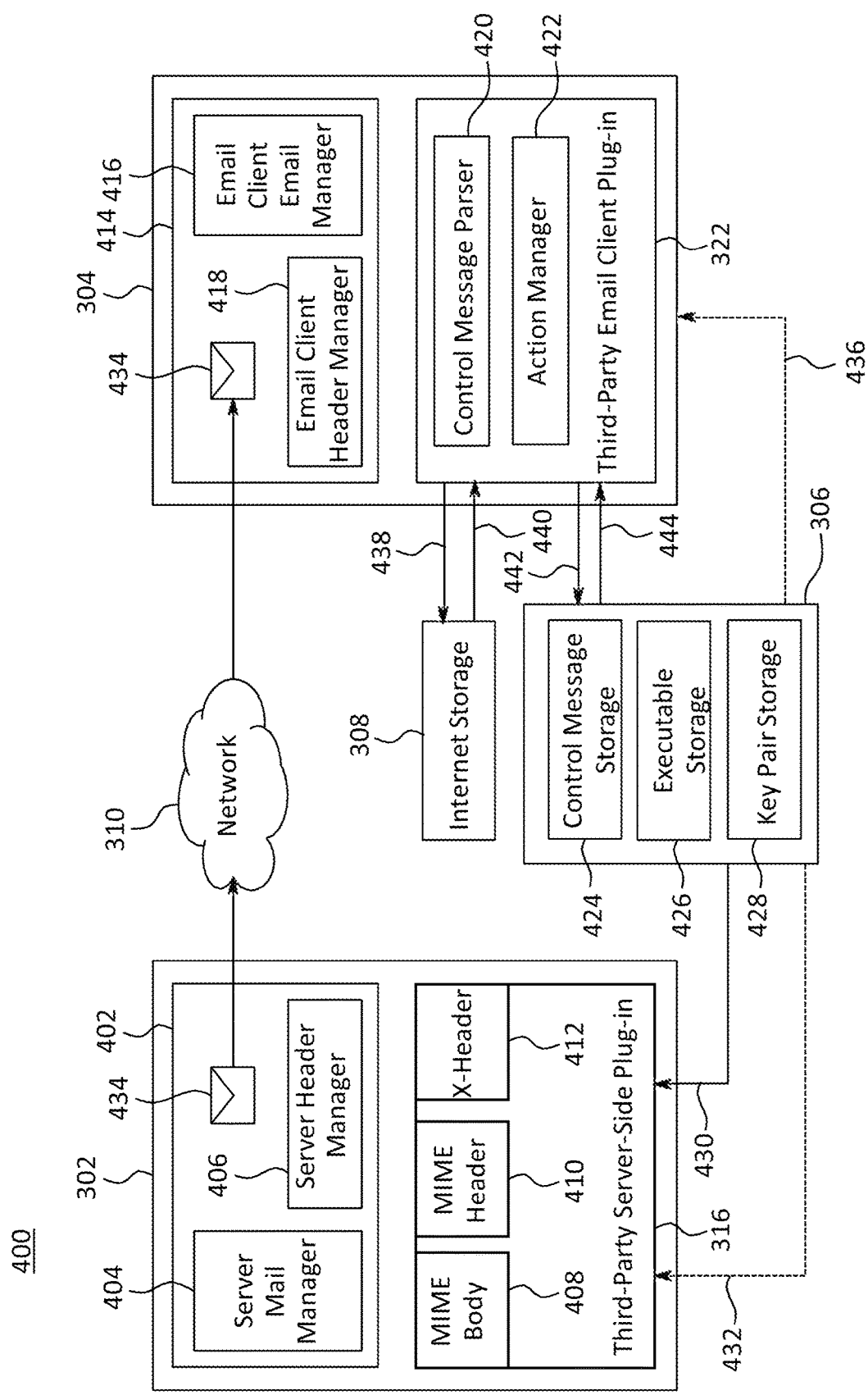
FIG. 4A depicts a detailed view of some of the architecture of the system of FIG. 3, according to some embodiments.

Referring to FIG. 4A in a general overview, FIG. 4A depicts a detailed view 400 of some of the architecture of system 300 of FIG. 3, according to some embodiments. In some embodiments, system 300 may include mail server 302, email client 304, third-party application server 306, internet storage 308, and network 310 enabling communication between the system components. In an implementation, mail server 302 may include server mail handler 402 and third-party server-side plug-in 316. Server mail handler 402 may be an application or a program that manages email operations including receiving emails, sending emails, and storing emails. Server mail handler 402 may include server mail manager 404 and server header manager 406. Server mail manager 404 may be an application or a program that manages emails and structures including injecting content and/or control message received from third-party application server 306 into outgoing emails. Server header manager 406 may be an application or a program that manages the generation of headers comprising the content and/or the control message and the injection of the headers into outgoing emails. Third-party server-side plug-in 316 is an application or a program that may provide content, control messages, and/or executables from third-party application server 306 to be injected into emails. Injected may refer to the addition, incorporation, inclusion or any other means by which the content, control messages, and/or executables from third-party application server 306 is added to emails. Third-party server-side plug-in 316 may include storage for MIME body 408, storage for MIME header 410, and storage for X-header 412. MIME may refer to an internet standard that enables exchange of different kinds of data files on the Internet and email. MIME supports content such as for example audio, video, images, application programs and application specific data in addition to the ASCII text handled in SMTP. MIME defines techniques for non-text information to be encoded as text under base64 encoding. The MIME standard defines the structure of the MIME body for the email message and MIME-specific fields in the message header.

Referring again to FIG. 4A, in some embodiments, storage for MIME body 408, also referred to as MIME body 408 may store MIME body templates. Further, in some embodiments, storage for MIME header 410, also referred to as MIME header 410 may store a plurality of MIME headers. Each MIME header may include a label, for example a MIME-Version, and a value, for example 1.0. In an example, a MIME header may be used to select an appropriate "player" application for the type of data the MIME header indicates. Some of these players may be built into the email client, for example, the email client may come with GIF and JPEG image players as well as the ability to handle HTML files while other players may need to be downloaded. In some embodiments, storage for X-header 412, also referred to as X-header 412 may store a plurality of X-headers. An X-header may be understood as a custom proprietary email header that allow capabilities that are not offered with standard email headers. X-headers are called such because their name must begin with "X-" (to delineate them from standardized header fields). X-headers may be added to emails for various reasons, for example, to mark emails as unwanted using an X-header "X-Spam-Status: Yes". In an implementation, X-headers may facilitate communication between third-party application server 306 and third-party email client plug-in 322.

In some embodiments, email client 304 may include client mail handler 414 and third-party email client plug-in 322. Client mail handler 414 may include email client email manager 416 and email client header manager 418. Email client email manager 414 may be an application or a program that manages emails and their structures including identifying and removing content and/or control message from third-party application server 306 from email bodies. Email client header manager 418 may be an application or a program that manages headers of emails and their structures including identifying and removing content and/or control message from third-party application server 306 from email headers. Further, third-party email client plug-in 322 may include control message parser 420 and action manager 422. Control message parser 420 may parse email bodies and/or email headers for content and/or control message comprising one or more instructions. Action manager 422 may perform one or more actions based on content and/or one or more instructions identified by control message parser 420.

Referring again to FIG. 4A, in some embodiments, third-party application server 306 may include control message storage 424, executable storage 426, and key pair storage 428. Control message storage 424 may store control messages for third-party email client plug-in 322 to perform a specific action of one or more actions. Control message may be a directive comprising one or more instructions to third-party email client plug-in 322 to perform one or more actions. In one embodiment, the control message may include a pointer to a lookup element stored in third-party application server 306 or internet storage 308. The lookup element may lead third-party email client plug-in 322 to content and/or one or more instructions for performing an action of one or more actions. In another embodiment, the control message may include one or more instructions for third-party email client plug-in 322 for performing a specific action of one or more actions. In an example, the one or more instructions may relate to a property of user of email client 304, for example the user's name, the user's organization unit, the user's geographic location, and the like. The aforementioned properties may vary from user to user. The aspect of the one or more instructions relating to a property of the user of email client enables third-party application server 306 to send a single control message via an email to all third-party email client plug-ins at all recipient email clients, enabling personalized actions with one control message. In yet another embodiment, the control message may include commands to access third-party application server 306 for further instructions. Executable storage 426 may store executables for third-party email client plug-in 322 to perform actions. In one example, an executable may be a software update for third-party email client plug-in 322. In another example, the executable may be a bug-fix patch for third-party email client plug-in 322.

Referring again to FIG. 4A, in an implementation, key pair storage 428 may include a plurality of unique key pairs and may also include a plurality of group key pairs. In an example, key pair storage 428 may include a unique key pair for each third-party server-side plug-in 316 or for each third-party email client plug-in 322. In a further example, key pair storage 428 may include a group key pair for each group of third-party email client plug-ins 322 and each group of email clients 304. The use of unique key pairs or group key pairs may depend on the circumstance. In an implementation, if third-party application server 306 wishes to communicate individual information to a single endpoint (such as email client 304 or third-party email client plug-in 322), it may do so using a unique key pair. In some implementations, if third-party application server 306 wishes to communicate common information to multiple endpoints, third-party application server 306 may do so using a group key pair. For instance, when a user installs third-party email client plug-in 322, third-party email client plug-in 322 may receive a key from the unique key pair and a key from one or more group key pairs. The other key from the unique key pair may be used by third-party application server 306 and is referred to herein as a server-side unique key of a key pair. If third-party application server 306 may wish to customize the actions performed on a per-email-client basis, then third-party application server 306 may use one of its server-side unique keys to encrypt the control messages. In some examples, email client 304 or third-party email client plug-in 322 may try to decrypt the control messages using the keys that email client 304 or third-party email client plug-in 322 has, and if email client 304 or third-party email client plug-in 322 is able to generate plain text or other decodable content with one of its keys, then email client 304 or third-party email client plug-in 322 may act on the plain text or other decodable content thereby retrieved from the control messages. If email client 304 or third-party email client plug-in 322 is not able to generate plain text, then the email does not contain an action for that specific email client. In additional examples, third-party application server 306 may wish to send actions to multiple email clients and may accomplish this by encrypting the control message using a group key (herein referred to as a server-side group key) from one of its group key pairs. For instance, if third-party application server 306 requires a number of email clients to download and run a software upgrade or a patch to third-party email client plug-in 322 (or plug-in), then third-party application server 306 may encrypt the control message with a server-side group key from a group key pair. Then any email clients that have the corresponding key of the group key pair will be able to decrypt the control message and execute the control message (for example causing email client 304 or third-party email client plug-in 322 to initiate and complete the software update procedure).

In an example, third-party application server 306 may send a control message to multiple email clients. Third-party application server 306 may encrypt the control message using a group key. For instance, if third-party application server 306 wants several email clients to download, run, and upgrade a patch of third-party email client plug-in 322, then third-party application server 306 may encrypt the control message with a group key. Accordingly, those email clients that have a corresponding key to the group key may be able to decrypt the control message and execute instructions included in the control message.

In operation, whenever third-party application server 306 wishes to communicate with third-party email client plug-in 322 for execution of certain tasks, third-party application server 306 may create control message 430 and send control message 430 to mail server 302 to be sent out to email client 304. Control message 430 may include information and/or instructions for third-party email client plug-in 322 to perform one or more actions. In an implementation, third-party application server 306 may include a control message in the email message, which gets downloaded to the user's inbox when the user is online. The user may be interchangeably referred to as an email recipient or a message recipient. In some examples, control message 430 may instruct third-party email client plug-in 322 to retrieve one or more instructions from third-party application server 306 while the user is online. Since, the email message has already been downloaded and the email message includes control message 430 comprising information for third-party email client plug-in 322 to perform actions, third-party email client plug-in 322 is configured to act on the information even when the user is offline. In an example, execution of the one or more instructions may be triggered by the user's interaction with the email message, based on a timer expiring, based on a specific date specified in control message 430, or any other triggering mechanism.

In another implementation, third-party application server 306 may specify a Uniform Resource Locator (URL) and/or a lookup table index to mail server 302 for mail server 302 to retrieve content for creating control message 430. In an example, information associated with URL and lookup tables may be stored in internet storage 308. Further, process of conveying the control message, e.g., via X-header, MIME-header, in the message may also be stored in internet storage 308. In an implementation, third-party server-side plug-in 316 may access internet storage 308 to retrieve content for creating control message 430. Further, third-party application server 306 may send an encryption key 432 to mail server 302. Third-party server-side plug-in 316 may then encrypt control message 430 using encryption key 432. Thereafter, third-party server-side plug-in 316 may create plug-in X-header comprising control message 430 and inject the plug-in X-header in email message 434. In an example, third-party server-side plug-in 316 may inject the plug-in X-header in email message 434 via Application Programming Interface (API) and/or via other known header injection techniques. In some examples, third-party server-side plug-in 316 may inject the plug-in X-header comprising control message 430 into email message 434 in a way that control message 430 is not visible to the user of email message 434, however third-party email client plug-in 322 is able to extract control message 430 from email message 434. Header injection techniques as discussed herein are described minimally for sake of brevity as the techniques may include known techniques. Also, proprietary injection header techniques that can be used are also contemplated herein.

Thereafter, mail server 302 may send email message 434 including the plug-in X-header to email client 304 on which third-party email client plug-in 322 is installed. On receiving email message 434, control message parser 420 of third-party email client plug-in 322 may identify control message 430 within the plug-in header. Further, control message parser 420 may decrypt control message 430 using decryption keys 436. Decryption keys 436 may include a group key and a single key. In an example, third-party email client plug-in 322 may receive decryption keys 436 from third-party application server 306 when the user installs third-party email client plug-in 322 on email client 304. If third-party email client plug-in 322 is able to generate plain text with one of its keys, then third-party email client plug-in 322 will act on the plain text. If third-party email client plug-in 322 is not able to generate plain text with the keys, then email message 434 does not contain an action for that specific email client. Control message 430 is processed by third-party email client plug-in 322 and may relate to email message 434, may relate to email client 304, may relate to the user of email client 304, and/or may relate to third-party email client plug-in 322. In an example, control message 430 may include a pointer to a location and/or Uniform Resource Locator (URL) directive from where third-party email client plug-in 322 may retrieve instructions for performing an action. In an example, control message 430 may include a pointer to internet storage 308 for downloading the instructions. In another example, control message 430 may include a pointer to third-party application server 306 for downloading the one or more instructions. In instances when control message 430 includes a pointer to internet storage 308, third-party email client plug-in 322 may access 438 internet storage 308 for identifying the one or more instructions. Upon identifying the one or more instructions, third-party email client plug-in 322 may retrieve/download 440 the executable instructions from internet storage 308. In instances where control message 430 includes a pointer to third-party application server 306, third-party email client plug-in 322 may access 442 third-party application server 306 for identifying the one or more instructions. Upon identifying the one or more instructions, third-party email client plug-in 322 may retrieve/download 444 the executable instructions from third-party application server 306. In an implementation, third-party email client plug-in 322 may perform an action based on one or more instructions in control message 430 when control message 430 is received by email client 304 before or instead of being reflected in the user's inbox. In another implementation, action manager 422 of third-party email client plug-in 322 may perform an action based on the one or more instructions in control message 430.

As described above, the one or more instructions may relate to a property of a user. In one example, the property of the user may be a designation/role of the user. Consider an example of a team that includes programmers, an accountant, a manager and a legal executive. Email client for the team may have a pre-installed a priority setter plug-in. The priority setter plug-in may determine and provide emails different priority relevant to designation/role. In the current example, the manager may send an email to the team Distribution List (DL) for expediting a product release. The email may be important for programmers, but not an important email for the accountant and the legal executive. The priority setter plug-in may identify the content to be relevant to the programmers and marks the emails with a high priority. Further, priority setter plug-in may reschedule deadlines in calendars of the programmers. On the contrary, the same priority setter plug-in identifies that the email is not important to the accountant and the legal executive and thus marks the email as low priority and reschedules the calendars of the accountant and the legal executive. In the example, the message is same to everyone in the team, yet the team members receive a customized email with differently marked priorities.

As described above, the one or more instructions may relate to a property of the email client of the user. Consider an example of a reminder plug-in that identifies deadlines and sends periodic automatic reminders. A user may have been given a task to develop a software executable within a given time period. The reminder plug-in may identify the deadline and may schedule periodic reminder. Meanwhile the user takes a short vacation. One schedule of the reminder may fall during vacation period. The reminder plug-in identifies that the user is on vacation based on calendar and consequently may override the reminder or not send the reminder during the vacation period. However, when the user is back from vacation, the reminder plug-in provides a reminder on the impending deadlines. Another example defines a leadership email plug-in that applies an email read rule for leadership emails. To elaborate, the plug-in may keep the emails from leadership, highlighted in user's inbox until the user reads the email or for a fixed period of time. For example, message from CEO is highlighted in the inbox for a week or until the email is read by the user. Many such examples are contemplated herein.

Figure 4B:
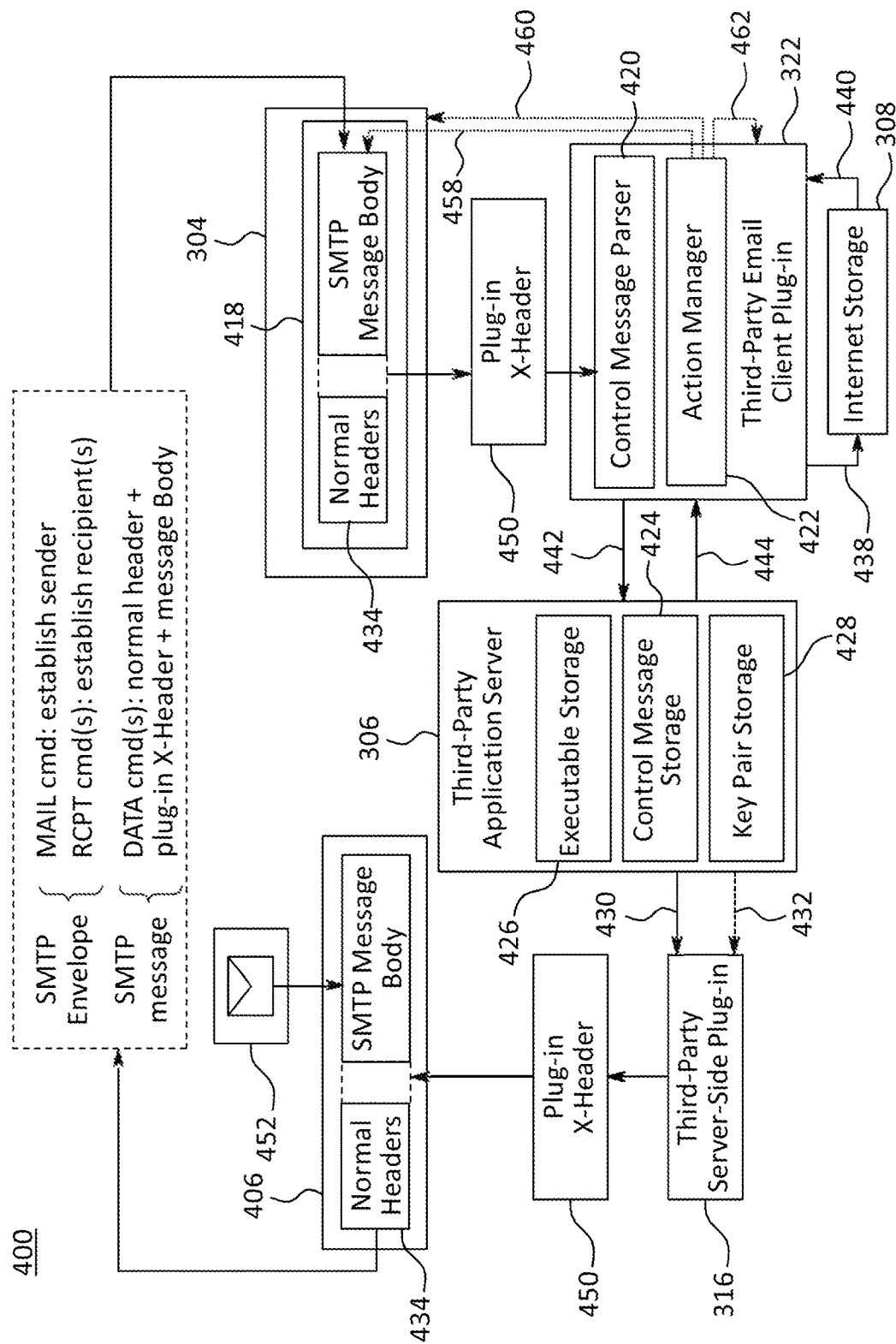
FIG. 4B is an illustration of injecting an X-header into a message by a third-party server-side plug-in, according to some embodiments.

FIG. 4B is an illustration 400 of injecting an X-header into an email message by third-party server-side plug-in 322, according to some embodiments. In some implementations, whenever third-party application server 306 wishes to communicate with third-party email client plug-in 322 for execution of an action of one or more actions, third-party application server 306 may send control message 430 to third-party server-side plug-in 316. Control message 430 may include one or more instructions and/or directives to third-party email client plug-in 322 to perform an action of one or more actions. In an example, if third-party application server 306 may wish to update an executable code of third-party email client plug-in 322, third-party application server 306 may send control message 430 which may specify a location (such as that of third-party application server 306) from where third-party email client plug-in 322 may find the executable code. In an example, third-party application server 306 may retrieve control message 430 from amongst a plurality of control messages stored in control message storage 424. Further, third-party application server 306 may send one key 432, also referred to as encryption key 432 of a key pair to third-party server-side plug-in 316. Third-party application server 306 may retrieve the key pair from amongst a plurality of key pairs stored in key pair storage 428. The other key of the key pair may be known beforehand to third-party email client plug-in 322.

Referring again to FIG. 4B, on receiving control message 430, third-party server-side plug-in 316 may create plug-in X-header 450. In an implementation, third-party server-side plug-in 316 may encrypt plug-in X-header 450 using encryption key 432 to prevent any unauthorized access to control message 430. In some implementations, third-party application server 306 may send the encryption key 432 to third-party server-side plug-in 316 for performing the encryption of plug-in X-header 450. In an example, third-party server-side plug-in 316 may encrypt entirety of plug-in X-header 450. In another example, third-party server-side plug-in 316 may encrypt only that content within plug-in X-header 450 which is intended for third-party email client plug-in 322. In an embodiment, third-party application server 306 may encrypt control message 430 using encryption key 432 before sending control message 430 to third-party server-side plug-in 316. Thereafter, third-party server-side plug-in 316 may inject plug-in X-header 450 into SMTP message 434. SMTP message 434 may include normal headers (also referred to as standard headers) and SMTP message body. In an implementation, the process of the injection of plug-in X-header 450 into SMTP message 434 may be managed by server header manager 406. Once plug-in X-header 450 is injected into SMTP message 434, mail server 302 may transmit SMTP message 434 comprising the normal headers, plug-in X-header 450, and the SMTP message body to email client 304. In an implementation, mail server 302 may transmit SMTP message 434 comprising encrypted plug-in X-header 450 to email client 304 via server user agent 452. Server user agent 452 may be any application capable of composing, sending, receiving, and reading emails messages. The transmission of SMTP message 434 from mail server 302 to email client 304 may be performed in several ways which are well known in the art and need not be explained here. In an example, mail server 302 may transmit SMTP message 434 via the SMTP protocol. In performing the transmission of a message, the SMTP protocol defines an SMTP envelope portion in which MAIL and RCPT commands are communicated between an email server and an email client in order to establish the sender of the email and one or more recipients of the email. Following the envelope portion, the SMTP protocol defines an SMTP message portion in which a DATA command is sent from the email server to the one or more email clients. The DATA command comprises SMTP message 434 in the form of one or more email message headers (which may also be referred to as one or more header fields) such as the normal headers and plug-in X-header 450, and the SMTP message body.

Referring again to FIG. 4B, in some implementations, email client 304 may receive SMTP message 434 comprising encrypted plug-in X-header 450 from mail server 302. On receiving SMTP message 434, third-party email client plug-in 322 may extract plug-in X-header 434 from SMTP message 434. In an implementation, email client header manager 418 may facilitate the extraction of plug-in X-header 450 from SMTP message 434. Upon extraction of plug-in X header 450, third-party email client plug-in 322 may decrypt plug-in X-header 450 using a key (the other key) of a key pair, wherein third-party application server 306 holds the corresponding key. As described earlier, third-party application server 306 may share one key of the key-pair with third-party email client plug-in 322. In an example, third-party email client plug-in 322 may decrypt X-headers of SMTP message 434 using its key until third-party email client plug-in 322 gets an X-header that third-party email client plug-in 322 recognizes as control message 430 from third-party application server 306 when decrypted using the key shared by third-party application server 306.

Referring again to FIG. 4B, control message parser 420 of third-party email client plug-in 322 may identify control message 430 within decrypted plug-in X header 450 and send control message 430 to action manager 422 of third-party email client plug-in 322 for acting on control message 430. Action manager 422 may follow the one or more instructions included in control message 430. In an example, control message 430 may include a pointer to a location and/or Uniform Resource Locator (URL) directive from where action manager 422 may retrieve instructions for performing an action. In an example, control message 430 may include a pointer to internet storage 308 for downloading the instructions. In another example, control message 430 may include a pointer to third-party application server 306 for downloading the instructions. In instances when control message 430 includes a pointer to internet storage 308, action manager 422 may access 438 internet storage 308 for identifying the instructions. Upon identifying the instructions, action manager 422 may retrieve/download 440 the executable instructions from internet storage 308. Further, in instances when control message 430 includes a pointer to third-party application server 306, action manager 422 may access 442 third-party application server 306 for identifying the one or more instructions. Upon identifying the one or more instructions, action manager 422 may retrieve/download 444 the one or more executable instructions from third-party application server 306. In an example, control message 430 may include one or more instructions to perform an action 458 of one or more actions to be performed on SMTP message 434. In another example, control message 430 may include action 460 to be performed on email client 304. In yet another example, control message 430 may include action 462 to be performed on third-party email client plug-in 322 itself. Other actions may include sending information to third-party application server 306, sending information to internet storage 308, deactivating itself (third-party email client plug-in 322), delete control message 430 from SMTP message 434 once third-party email client plug-in 322 has received control message 430 such that SMTP message 434 is not confusing to the email recipient (user) of email client 304, and retrieve instructions from third-party application server 306 while the email recipient is online and execute the instructions when the email recipient is offline.

Figure 4C:
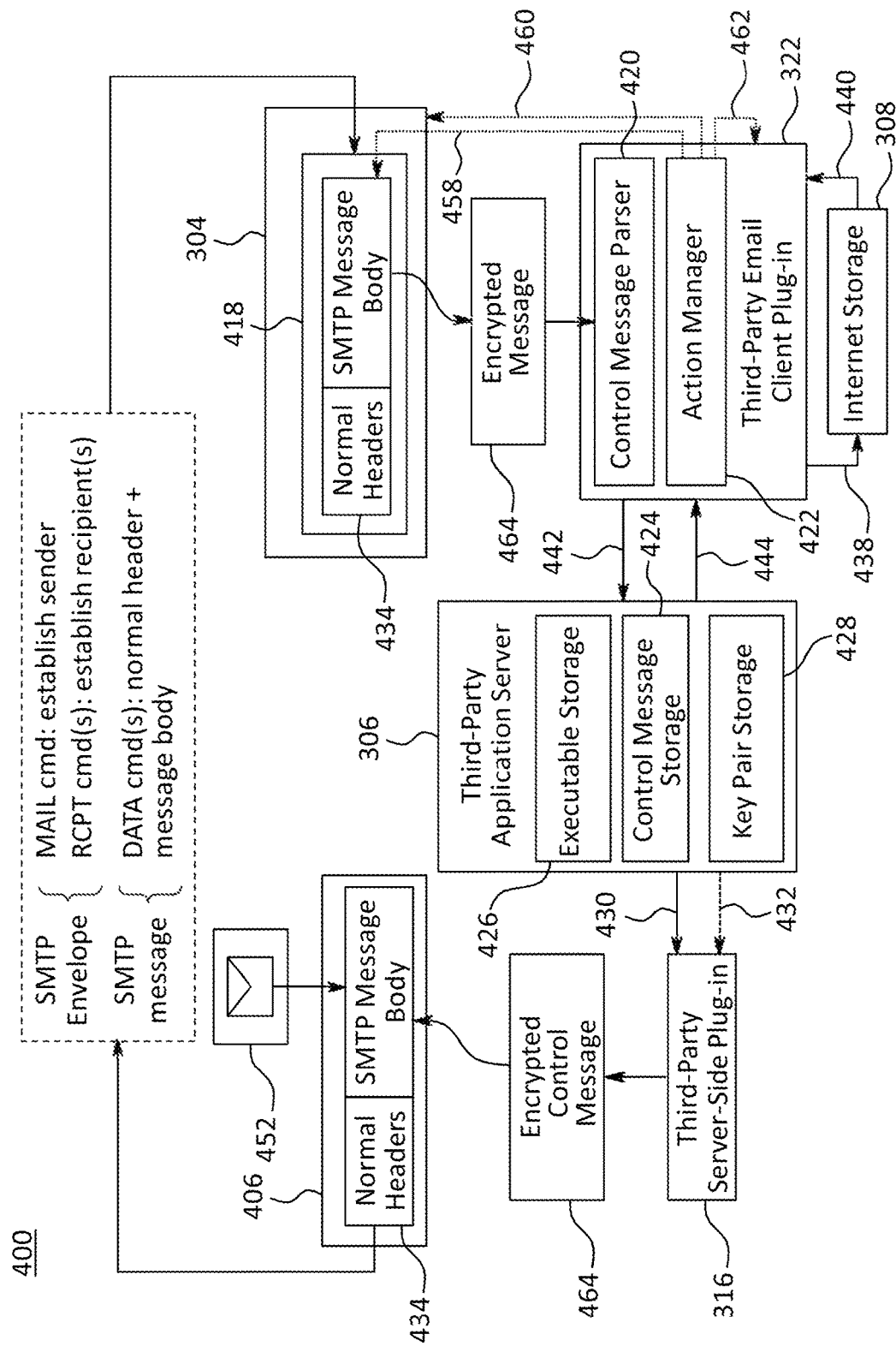
FIG. 4C is an illustration of embedding a control message into a body of a message by a third-party server-side plug-in, according to some embodiments.

FIG. 4C is an illustration 400 of embedding a control message into a body of message by third-party server-side plug-in 316, according to some embodiments. In some implementations, whenever third-party application server 306 wishes to communicate with third-party email client plug-in 322 for execution of certain actions, third-party application server 306 may send control message 430 to third-party server-side plug-in 316. Control message 430 may include content and/or one or more instructions in response to which third-party email client plug-in 322 may perform one or more actions. In an example, control message 430 may include address information from where the content and/or the one or more instructions for performing actions may be retrieved. The address information may be, for example, a pointer to a location and/or Uniform Resource Locator (URL) directive, memory address or memory block start and stop address. In an example, third-party application server 306 may retrieve control message 430 from amongst a plurality of control messages stored in control message storage 424. Third-party application server 306 may also send encryption key 432 of a key pair. Third-party application server 306 may retrieve the key pair from amongst a plurality of key pairs stored in key pair storage 428. The other key of the key pair may be known beforehand to third-party email client plug-in 322.

Referring again to FIG. 4C, on receiving control message 430 and encryption key 432, third-party server-side plug-in 316 may encrypt control message 430 using encryption key 432 to generate encrypted control message 464. Encrypted control message 464 may be interchangeably referred to as encrypted message 464. Control message 430 may be encrypted to prevent any unauthorized access to control message 430. Thereafter, third-party server-side plug-in 316 may embed encrypted control message 464 into SMTP message 434. SMTP message 434 may include normal headers and SMTP message body. In an implementation, third-party server-side plug-in 316 may embed encrypted control message 464 into the SMTP message body of SMTP message 434, for example using MIME formatting. In an example, third-party server-side plug-in 316 may embed encrypted control message 464 into subject, metadata, or an attachment of SMTP message 434. Further, encrypted control message 464 may include instructions to search different parts of SMTP message 434 for identifying control message 430. In an example, third-party server-side plug-in 316 may use an X-header to instruct third-party email client plug-in 322 as to where to find control message 430 in SMTP message 434. In another example, third-party server-side plug-in 316 may use an X-header to instruct third-party email client plug-in 322 as to how to decode or decrypt control message 430. Although, it has been described that third-party server-side plug-in 316 embeds encrypted control message 464 into the SMTP message body of SMTP message 434, in some embodiments, third-party application server 306 may embed encrypted control message 464 in SMTP message 434. In an implementation, the process of embedding encrypted control message 464 into the SMTP message body of SMTP message 434 may be managed by server header manager 406. Once encrypted control message 464 is embedded into the SMTP message body of SMTP message 434, mail server 302 may transmit SMTP message 434 comprising the normal headers and the SMTP message body comprising encrypted control message 464 to email client 304. In an implementation, mail server 302 may transmit SMTP message 434 comprising encrypted control message 464 to email client 304 via server user agent 452. The transmission of SMTP message 434 from mail server 302 to email client 304 may be performed in several ways which are well known in the art and need not be explained here.

Referring again to FIG. 4C, in some implementations, email client 304 may receive SMTP message 434 comprising encrypted control message 464 from mail server 302. On receiving SMTP message 434, control message parser 420 may identify encrypted control message 464 within SMTP message 434. In an implementation, email client header manager 418 may facilitate the extraction of encrypted control message 464 from SMTP message 434. Upon extraction of encrypted control message 464, control message parser 420 may decrypt encrypted control message 464 using a key (the other key) of a key pair shared by third-party application server 306, wherein third-party application server 306 holds the corresponding key.

Subsequently, control message parser 420 may send control message 430 to action manager 422 of third-party email client plug-in 322 for performing action based on one or more instructions identified through control message 430. As described above, control message 430 may include address information from where the one or more instructions for performing one or more actions may be retrieved. Action manager 422 may follow the one or more instructions included in control message 430. As described above, control message 430 may include a pointer to a location and/or Uniform Resource Locator (URL) directive from where action manager 422 may retrieve the one or more instructions for performing an action. In an example, control message 430 may include a pointer to internet storage 308 for downloading the one or more instructions. In another example, control message 430 may include a pointer to third-party application server 306 for downloading the one or more instructions. In instances when control message 430 includes a pointer to internet storage 308, action manager 422 may access 438 internet storage 308 for identifying the one or more instructions. Upon identifying the instructions, action manager 422 may retrieve/download 440 the one or more executable instructions from internet storage 308. For example, action manager 422 may access internet storage 308 and download the one or more instructions from URL mentioned in control message 430. Further, in instances when control message 430 includes a pointer to third-party application server 306, action manager 422 may access 442 third-party application server 306 for identifying the one or more instructions. Upon identifying the one or more instructions, action manager 422 may retrieve/download 444 the executable instructions from third-party application server 306.

In an example, control message 430 may include one or more instructions to perform action 458 on SMTP message 434. In another example, control message 430 may include an action 460 to be performed on email client 304. In yet another example, control message 430 may include action 462 to be performed on third-party email client plug-in 322 itself. Other actions may include sending information to third-party application server 306, sending information to internet storage 308, deactivating itself (third-party email client plug-in 322), delete control message 430 from SMTP message 434 once third-party email client plug-in 322 has received control message 430 such that SMTP message 434 is not confusing to the email recipient (user) of email client 304, and retrieve instructions from third-party application server 306 while the email recipient is online and execute the instructions when the email recipient is offline.

Figure 4D:
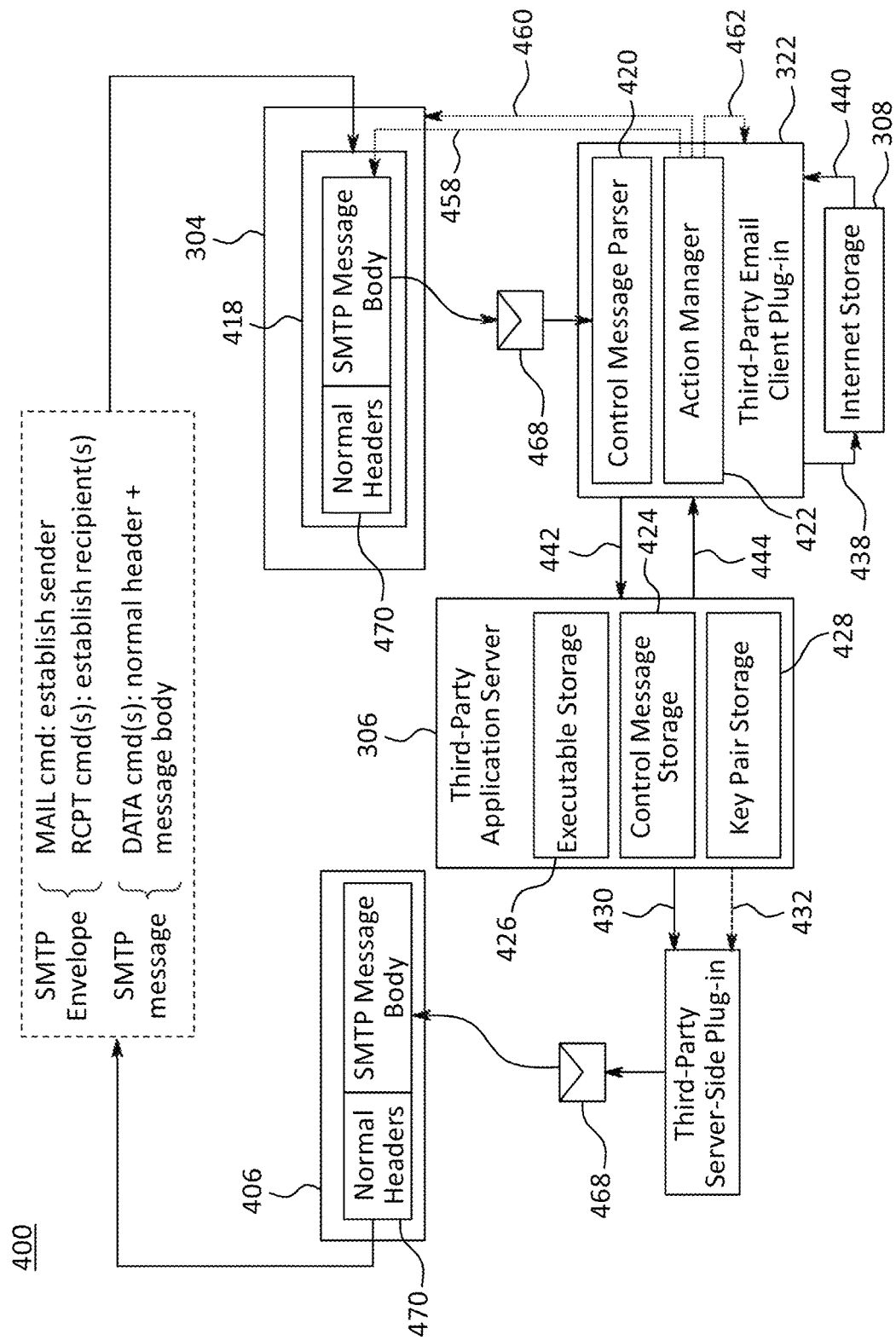
FIG. 4D is an illustration of creating a control email having a control message and embedding the control email into a message by a third-party server-side plug-in, according to some embodiments.

FIG. 4D is an illustration 400 of creating a control email having a control message and embedding the control email into an email message by third-party server-side plug-in 316, according to some embodiments. In some implementations, whenever third-party application server 306 wishes to communicate with third-party email client plug-in 322 for execution of certain tasks, third-party application server 306 may send control message 430 to third-party server-side plug-in 316. Control message 430 may include one or more instructions in response to which third-party email client plug-in 322 may perform one or more actions. In an example, control message 430 may include an executable code for third-party email client plug-in 322. The executable may be, for example, an update. In an example, control message 430 may specify a location (such as that of third-party application server 306) from where third-party email client plug-in 322 may find and/or download the executable code. In another example, control message 430 may specify a URL from where the executable code may be downloaded. In an example, third-party application server 306 may retrieve control message 430 from amongst a plurality of control messages stored in control message storage 424. Further, third-party application server 306 may send encryption key 432 of a key pair to third-party server-side plug-in 316. Third-party application server 306 may retrieve the key pair from amongst a plurality of key pairs stored in key pair storage 428. The other key of the key pair may be known beforehand to third-party email client plug-in 322.

Referring again to FIG. 4D, on receiving control message 430 and encryption key 432, third-party server-side plug-in 316 may encrypt control message 430 using encryption key 434 to generate an encrypted control message. Subsequently, third-party server-side plug-in 316 may create control email 468 having control message 430. Control email 468 may be a dedicated email that is created for the purpose of sending control message 430 from third-party application server 306 to third-party email client plug-in 322. In an example, control email 468 may include an instruction that causes third-party email client plug-in 322 to delete control email 468 once third-party email client plug-in 322 has received control message 430. For example, third-party email client plug-in 322 may remove control email 468 from recipient's inbox, may permanently delete control email 468, or may move control email 468 to a deleted items folder. Third-party server-side plug-in 316 may then embed control email 468 into SMTP message body of SMTP message 470, for example using MIME formatting. In an implementation, the process of embedding control email 468 into SMTP message body of SMTP message 470 may be managed by server header manager 406. Thereafter, mail server 302 may transmit SMTP message 470 comprising control email 468 to email client 304. The transmission of SMTP message 470 from mail server 302 to email client 304 may be performed in several ways which are known in the art and is not explained here for sake of brevity.

Referring again to FIG. 4D, in some implementations, email client 304 may receive SMTP message 470 from mail server 302. On receiving SMTP message 470, third-party email client plug-in 322 may extract control email 468 having encrypted control message 430 from SMTP message 470. In an implementation, email client header manager 418 may facilitate the extraction of control email 468 having encrypted control message 430 from SMTP message 470. Upon extraction of control email 468, control message parser 420 may identify control message 430 within control email 468 and then decrypt control message 430 using a key (the other key) of a key pair shared by third-party application server 306, wherein third-party application server 306 holds the corresponding key. Subsequently, control message parser 420 may send control message 430 to action manager 422 of third-party email client plug-in 322 for acting on control message 430. In an implementation, the action manager 422 may follow the instructions included in control message 430. As mentioned above, control message 430 may specify the location of third-party application server 306 from where third-party email client plug-in 322 may find and/or download the executable code. In an example, control message 430 may specify a URL from where the executable code may be downloaded. In instances when control message 430 includes a URL from where the executable code may be downloaded, action manager 422 may access 438 internet storage 308 based on the URL for identifying the executable code to be downloaded. Upon identifying the executable code, action manager 422 may download 440 the executable code from internet storage 308. Further, in instances when control message 430 specifies the location of third-party application server 306 from where the executable code may be downloaded, action manager 422 may access 442 third-party application server 306 based on the location included in control message 430 for identifying the executable code. Upon identifying the executable, action manager 422 may download 444 the executable code from third-party application server 306.

In an example, control message 430 may include action 458 to be performed on SMTP message 470. In another example, control message 430 may include action 460 to be performed on email client 304. In yet another example, control message 430 may include action 462 to be performed on third-party email client plug-in 322 itself. Other actions may include sending information to third-party application server 306, sending information to internet storage 308, deactivating itself (third-party email client plug-in 322), delete control message 430 from SMTP message 470 once third-party email client plug-in 322 has received control message 430 such that SMTP message 470 is not confusing to the email recipient (user) of email client 304, and retrieve instructions from third-party application server 306 while the email recipient is online and execute the instructions when the email recipient is offline.

Figure 5A:
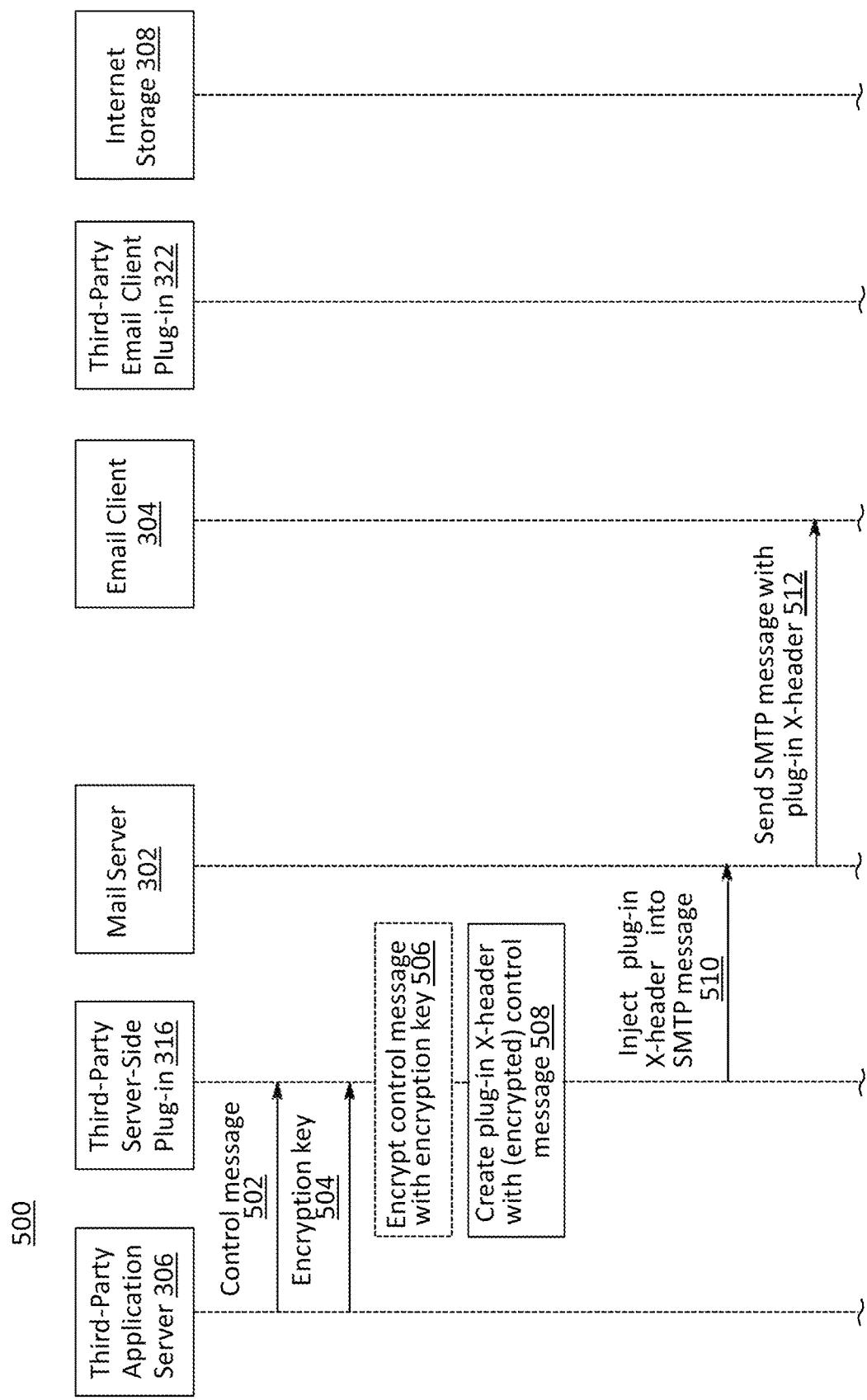
FIGS. 5A and 5B depict a flow diagram illustrating an example implementation of an X-header injection into a message, according to some embodiments.
Figure 5B:
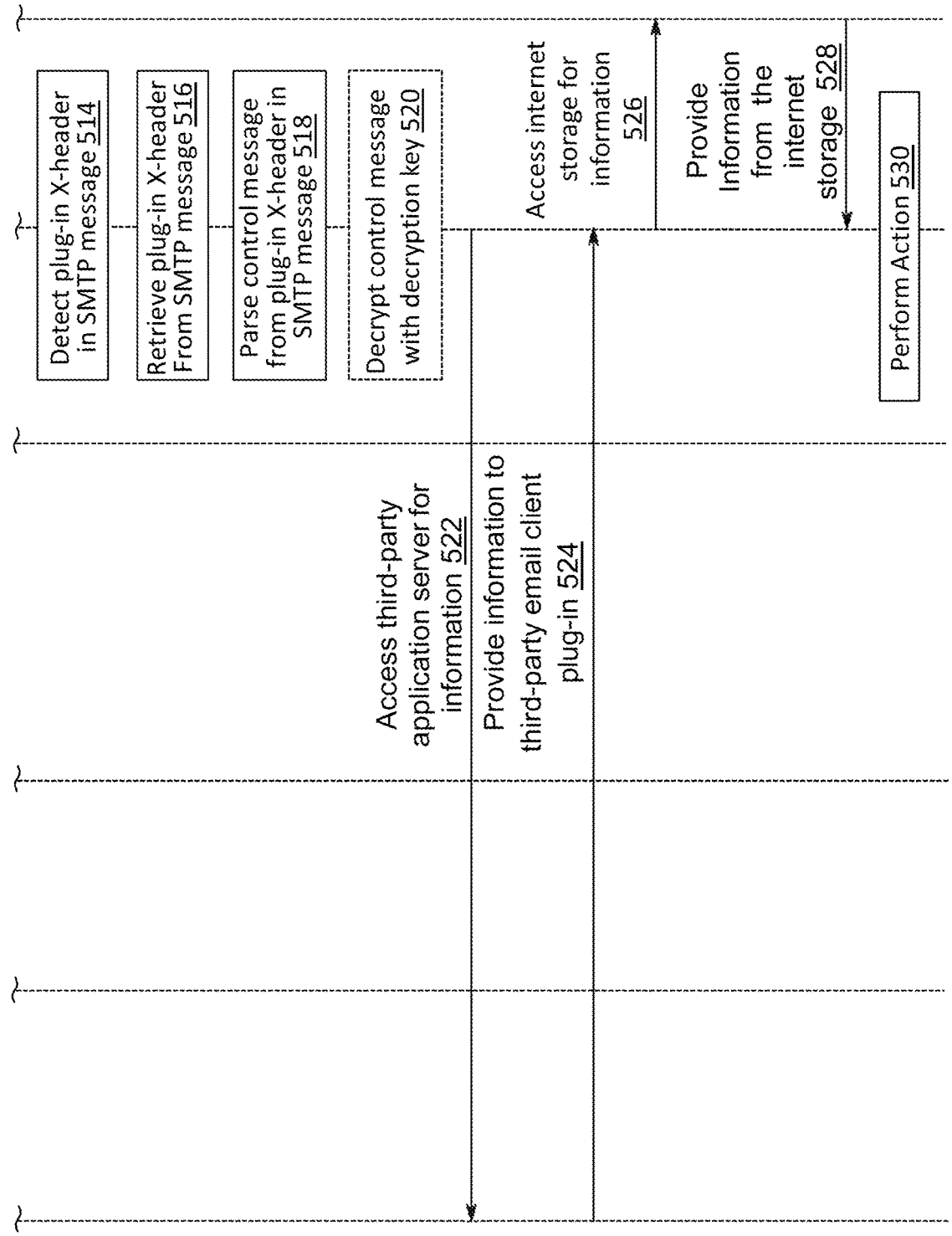

FIGS. 5A and 5B depict a flow diagram 500 illustrating an example implementation of X-header injection into a message by third-party server-side plug-in 316.

At step 502, in some implementations, third-party application server 306 may send a control message to third-party server-side plug-in 316. The control message may include one or more instructions in response to which third-party email client plug-in 322 may perform one or more actions. In an example, third-party application server 306 may send the control message to third-party server-side plug-in 316 whenever third-party application server 306 wishes to communicate with third-party email client plug-in 322 for execution of certain tasks. In an example, if third-party server application server 306 has an update for an executable code of third-party email client plug-in 322, then third-party application server 306 may send the control message including a location from where third-party email client plug-in 322 may find the update for the executable code.

At step 504, in some implementations, third-party application server 306 may send one key, also referred to as encryption key, of a key pair to third-party server-side plug-in 316. Third-party application server 306 may retrieve the key pair from key pair storage 428. In an example, whenever third-party application server 306 wishes to customize the actions to be performed on a per-email-client basis, third-party application server 306 may send the encryption key to third-party server-side plug-in 316 for encryption of the control message.

At step 506, in some implementations, third-party server-side plug-in 316 may encrypt the control message with the encryption key of the key pair (with the other key of the key pair being known beforehand to third-party email client plug-in 322). Third-party server-side plug-in 316 may encrypt the control message to prevent any unauthorize access to the control message. In some implementations, third-party application server 306 may itself perform the encryption of the control message using the encryption key and send the encrypted control message to third-party server-side plug-in 316.

At step 508, in some implementations, third-party server-side plug-in 316 may create a plug-in X-header with encrypted control message. As may be understood, the plug-in X-header may be custom headers that allow mail server 302 (or by a component therein, such as third-party server-side plug-in 316) to include data, for example, the encrypted control message (that can be interpreted by third-party email client plug-in 322 to recognize the instructions included in the control message).

At step 510, in some implementations, third-party server-side plug-in 316 may inject the plug-in X-header into an SMTP message. In an example, third-party server-side plug-in 316 may inject the plug-in X-header comprising encrypted control message into the SMTP message in a way that the control message is not visible to recipient of the SMTP message, however third-party email client plug-in 322 is able to extract the control message from the SMTP message. In an example, third-party server-side plug-in 316 may inject the plug-in X-header into the SMTP message via Application Programming Interface (API) and/or via other known header injection techniques.

At step 512, in some implementations, mail server 302 may send the SMTP message with the plug-in X-header to email client 304. Mail server 302 may transmit the SMTP message from mail server 302 to email client 304 in several ways which are well known in the art and need not be explained here.

Referring now to FIG. 5B which is a continuation of FIG. 4A, at step 514, in some implementations, third-party email client plug-in 322 may detect the plug-in X-header in the SMTP message.

At step 516, in some implementations, third-party email client plug-in 322 may retrieve the plug-in X-header from the SMTP message.

At step 518, in an implementation, third-party email client plug-in 322 may identify the control message within the plug-in X-header in the SMTP message. In an implementation, control message parser 420 of third-party email client plug-in 322 may identify the control message within the plug-in X-header in the SMTP message.

At step 520, in an implementation, third-party email client plug-in 322 may decrypt the control message using the aforementioned other key, also referred to as a decryption key, of the key pair. The decryption key may be shared by third-party application server 306 distinct from mail server 302. In an implementation, third-party application server 306 may also share one or more group keys (also referred to as group decryption keys) with third-party email client plug-in 322.

At step 522, in an implementation, third-party email client plug-in 322 may access third-party application server 306 for information. The information can be an executable code, user information, or any other information needed for third-party email client plug-in 322 to perform the action. In an example, third-party email client plug-in 322 may access third-party application server 306 to extract information based on an identifier included in the control message.

At step 524, in an implementation, third-party application server 306 may provide the information to third-party email client plug-in 322. For example, third-party application server 306 may provide instructions as to what needs to be done based on the control message. In an example, third-party application server 306 may provide the executable code for downloading to the third-party client plug-in 322.

At step 526, in an implementation, third-party email client plug-in 322 may access internet storage 308 for information. The information can be an executable code, user information, or any other information needed for third-party email client plug-in 322 to perform the action. In an example, third-party email client plug-in 322 may access internet storage 308 to extract information based on an identifier included in the control message.

At step 528, in an implementation, internet storage 308 may provide the information to third-party email client plug-in 322. For example, internet storage 308 may provide instructions as to what needs to be done based on the control message. In an example, internet storage 308 may provide the executable code for downloading to the third-party client plug-in 322.

At step 530, in an implementation, third-party email client plug-in 322 performs the action based on the information obtained from third-party application server 306 and/or internet storage 308.

Figure 6A:
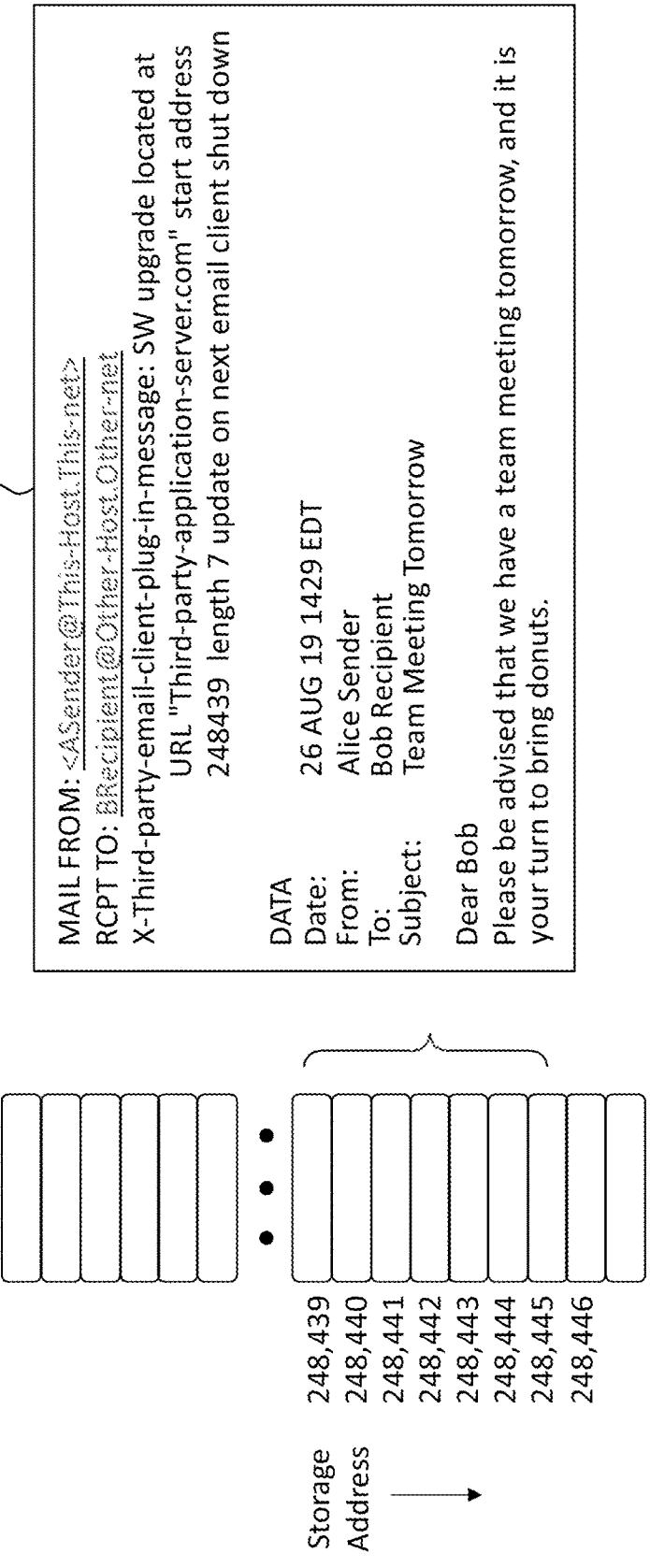
FIG. 6A depicts an example of a Simple Message Transfer Protocol (SMTP) message comprising a control message, according to some embodiments.

Referring to FIG. 6A, FIG. 6A depicts an example 600 of an SMTP message 610 comprising a control message. The control message may comprise instructions for third-party email client plug-in 322 to perform certain actions. In an implementation, control message may include instructions for third-party email client plug-in 322 to fetch an executable code and perform an autonomous update of the plug-in software.

In some implementations, control message may specify a location (such as that of third-party application server 306) from where third-party email client plug-in 322 may find the executable code. For example, control message may specify a URL of third-party application server 306. In an example, the executable code may be stored in executable storage 426 of third-party application server 306. The control message may further specify when third-party email client plug-in 322 should download the new executable code, and where third-party email client plug-in 322 should store the new executable code for later access. In some examples, the control message may include a batch file that causes third-party email client plug-in 322 to begin a software update procedure. The control message may also include a time period when third-party email client plug-in 322 should run the batch file to initiate the software update process. In an example, the time period may be an absolute time, such as. 11:59 p.m. on a given day. In another example, the time may be a time of day, such as 11:59 p.m. on the day the control message is received. In yet another example, the update timing may be relative to an event, such as an opening or closing of email client 304. As illustrated in FIG. 6A, SMTP message 610 includes an X-header comprising control message. In the example shown, control message includes an instruction for third-party email client plug-in 322 to fetch an executable code from third-party application server 306 at URL "Third-party-email-client-plug-in-message" starting at storage address 248439 for length 7 and to perform an autonomous software update when the email client is next closed. In an example, the executable code may be stored in executable storage 426 of third-party application server 306.

Although, it is shown that control message includes the location of the new executable code from where third-party email client plug-in 322 can fetch the new executable code, in some implementations, third-party application server 306 may include the new executable code itself in an X-header of SMTP message 610. In such scenarios, once SMTP message 610 has been received, third-party email client plug-in 322 is enabled to update itself without needing further online connectivity to obtain the executable code. In some implementations, instead of specifying the location of third-party application server 306, for example the URL of third-party application server 306, the control message may include one or more instructions to access a cloud-based server based on an identifier in SMTP email message, and to then download the one or more instructions from the cloud-based server to determine what to do based on the identified message. In examples, the URL to the cloud-based server may be configured as part of third-party email client plug-in 322 such that the X-header contains one or more instructions and/or a directive to third-party email client plug-in 322, and not the URL of third-party application server 306.

Referring again to FIG. 6A, unidentified boundaries may be put around a given portion of text of the X-header to hide the portion of text from view from the user of email client 304 as email client 304 may not be aware of how to display the portion of text. Further, this enables third-party application server 306 to send confidential attachments that only third-party email client plug-in 322 interpret or obtain.

Referring to FIG. 6B, FIG. 6B depicts another example 600 of an SMTP message 620 comprising a control message, according to some embodiments. The control message comprises instructions for third-party email client plug-in 322 to perform certain actions.

FIG. 6B describes the same process as FIG. 6A, except that the control message is included in a MIME header or a MIME attachment that is inserted into SMTP message 620 and may not be visible to the recipient of SMTP message 620 or to the user of email client 304. The Content-type "plug-in/channel" may not be a known MIME content type. Thus, it may not be possible for a standard MIME compatible email client to recognize this content type. As a result, email client 304 may not display the text that is included in the boundary for "Instructions" to the recipient of SMTP message 620. Thus, by having additional information in the email (such as SMTP message 620) in a format that is not shown to the email recipient, it may be possible for third-party application server 306 to communicate with third-party email client plug-in 322.

Further, as can be seen in FIG. 6B, the second body part of SMTP message 620 includes a file attachment. Since the file attachment is an ASCII text file, the file attachment is sent with no encoding and its content-type is given as text/plain. The "Content-Disposition: attachment" header may have a parameter, "filename=", which specifies a suggested name for the file. This header specifies that this body part may have to be treated as a file and saved on local storage under the suggested file name instead of being displayed to the email recipient.

Figure 7:
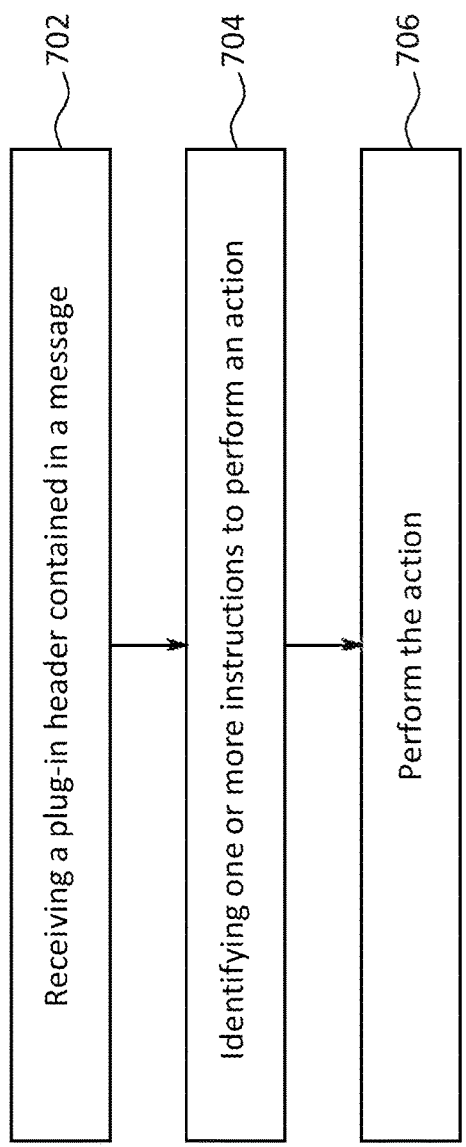
FIG. 7 depicts an implementation of a method for performing an action based on a plug-in header included in a message, according to some embodiments.

Referring to FIG. 7, FIG. 7 depicts an implementation of a method 700 for performing an action based on a plug-in header included in a message, according to some embodiments.

The order in which the method is described is not intended to be construed as a limitation, and any number of the described method blocks can be combined in any order to implement the method, or an alternative method Step 702 includes receiving a plug-in header contained in a message. In an implementation, email client 304 receives the message comprising the plug-in header from mail server 302. In an example, the message may be an email message. Further, the plug-in header may be a X-header comprising one or more instructions to instruct third-party email client plug-in 322 to perform an action of one or more actions. In an embodiment, the plug-in header may be injected into the message at mail server 302 by third-party application server 306 through third-party server-side plug-in 316 for directing third-party email client plug-in 322 to perform the action.

Step 704 includes identifying one or more instructions to perform an action of one or more actions. In an implementation, third-party email client plug-in 322 may identify the one or more instructions from the plug-in header. In one example, the plug-in header may provide a pointer to a lookup element in third-party application server 306. The lookup element may identify content for third-party email client plug-in 322 to use in performing the action. For example, the lookup element may identify the one or more instructions for third-party email client plug-in 322 to perform the action. In one example, the one or more instructions may relate to a property of a user of email client 304 such as a user's name, a user's manager, a user's start date, a user's organization unit, a user's geographic location, a user's length of time at the company, risk score, and the like. In another example, the one or more instructions may relate to a property of email client 304 of the user such as importance, sensitivity, and security. In some embodiments, in case the message received by email client 304 comprises an encrypted plug-in header, then third-party email client plug-in 322 may decrypt the plug-in header using a key shared by third-party application server 306 before identifying the one or more instructions from the plug-in header.

Step 706 includes performing the action. In response to identifying the one or more instructions, third-party email client plug-in 322 may perform the action. In an example, the action may be performed on the message. In another example, the action may be performed on email client 304. In yet another example, action may be performed on third-party email client plug-in 322 itself. In one example, the action may be based at least on the property of the user, or on the property of email client 304.

Figure 8:
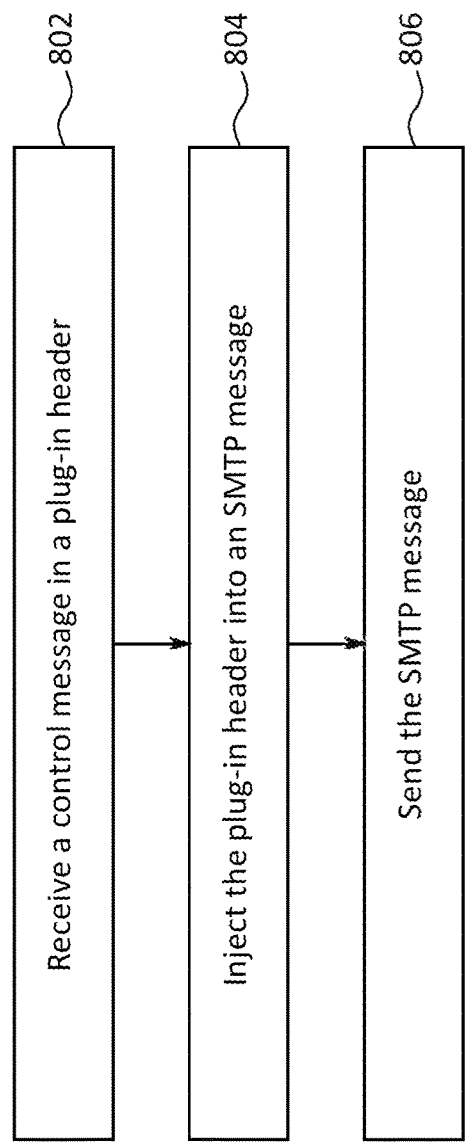
FIG. 8 depicts an implementation of a method for injecting a plug-in header in a message, according to some embodiments.

Referring to FIG. 8, FIG. 8 depicts an implementation of a method 800 for injecting a plug-in header in a message, according to some embodiments.

The order in which the method is described is not intended to be construed as a limitation, and any number of the described method blocks can be combined in any order to implement the method, or an alternative method.

Step 802 includes receiving a control message in a plug-in header. In an implementation, third-party server-side plug-in 316 may receive the plug-in header comprising the control message from third-party application server 306. The control message may include one or more instructions and/or directives for third-party email client plug-in 322 to perform one or more actions. In one example, the control message may include a pointer to a lookup element in third-party application server 306. In another example, the control message may include one or more instructions for third-party email client plug-in 322 to fetch an executable code and to perform an autonomous update of third-party email client plug-in 322 using the executable code. As such, the control message may also specify a location (such as that of third-party application server 306) from where third-party email client plug-in 322 can find the executable code. In yet another embodiment, the control message may include commands to access third-party application server 306 for further steps.

Step 804 includes injecting the plug-in header into an SMTP message. In an implementation, upon receiving the plug-in header comprising the control message, third-party server-side plug-in 316 may inject the plug-in header into the SMTP message. Third-party server-side plug-in 316 may inject the plug-in X-header comprising control message in the SMTP message in a way that the control message is not visible to a recipient of the SMTP message, however third-party email client plug-in 322 may be able to extract the control message from the SMTP message. In an implementation, third-party server-side plug-in 316 may inject the plug-in header into the SMTP message responsive to third-party application server 306 providing instructions to mail server 302 that communicates the SMTP message to email client 304.

Step 806 includes sending the SMTP message. In an implementation, mail server 302 may send the SMTP message to email client 304. The transmission of the SMTP message from mail server 302 to email client 304 may be performed in several ways which are well known in the art and need not be explained here.

Figure 9:
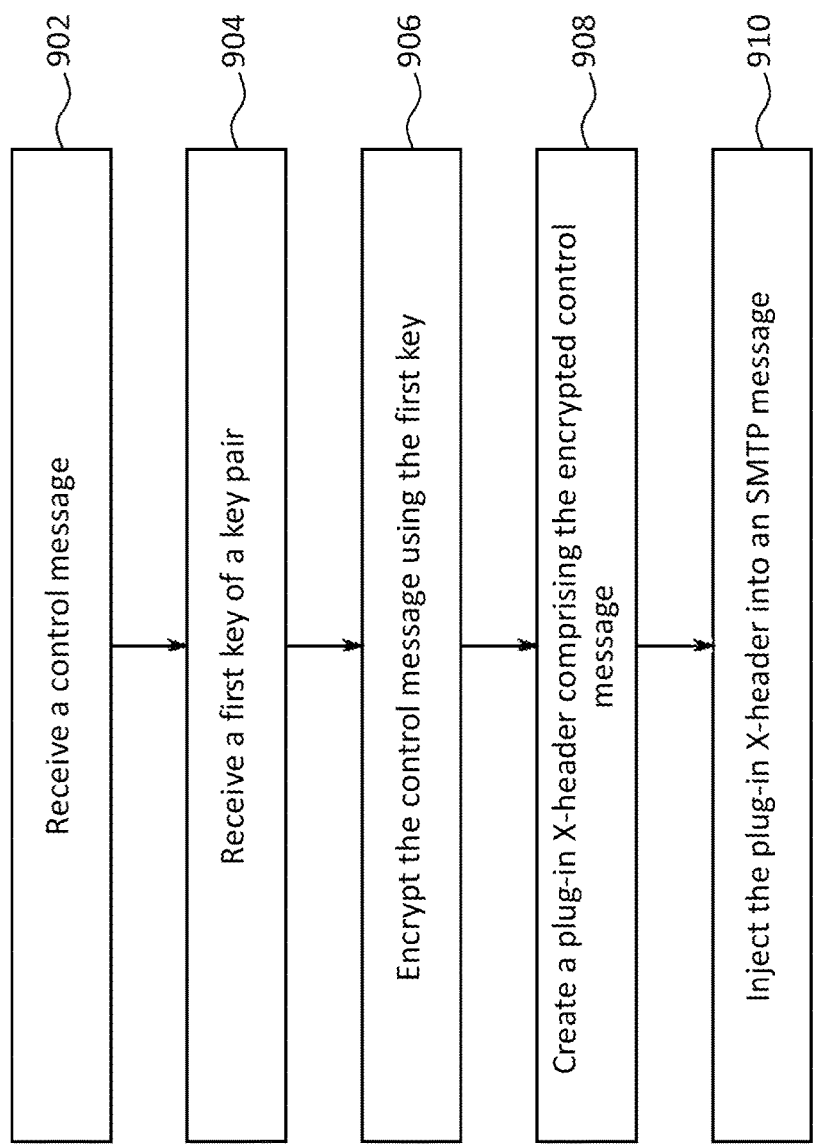
FIG. 9 depicts an implementation of a method for encrypting a control message to be communicated to a third-party email client plug-in, according to some embodiments.

Referring to FIG. 9, FIG. 9 depicts an implementation of a method 900 for encrypting a control message to be communicated to a third-party email client plug-in, according to some embodiments.

The order in which the method is described is not intended to be construed as a limitation, and any number of the described method blocks can be combined in any order to implement the method, or an alternative method Step 902 includes receiving a control message. In an implementation, mail server 302 may receive the control message from third-party application server 306. The control message may be targeted to third-party email client plug-in 322 for execution of an action of one or more actions. The control message may include one or more instructions for third-party email client plug-in 322 to perform the custom action of one or more actions. The instructions may include dynamic elements. In one example, the control message may include instructions related to a property of a user of email client 304. For example, the control message may include instructions related to the user's name, the user's manager, the user's organization unit, the user's geographic location, and the like. As would be understood by a skilled person, these properties vary from user to user. This may allow third-party application server 306 to send a single control message to multiple third-party email client plug-ins 322 installed at multiple email clients, thus enabling personalized actions with one control message. In another example, the control message may include instructions related to a property of email client 304.

Step 904 includes receiving a first key of a key pair. In an implementation, third-party server-side plug-in 316 may receive the first key of the key pair from third-party application server 306. In an example, when third-party application server 306 wishes to customize the actions to be performed on a per-email-client basis, third-party application server 306 may send the first key to third-party server-side plug-in 316 for encryption of the control message, where third-party application server 306 holds the corresponding key of the key pair. Third-party application server 306 may retrieve the key pair from key pair storage 428.

Step 906 includes encrypting the control message using the first key. In an implementation, upon receiving the first key of the key pair, third-party server-side plug-in 316 may encrypt the control message. In some implementations, third-party application server 306 may itself perform the encryption of the control message and send the encrypted control message to mail server 302. In some implementations, third-party application server 306 may send the first key of the key pair to mail server 302 for performing the encryption of the control message.

Step 908 includes creating a plug-in X-header comprising the encrypted control message. In an implementation, subsequent to encrypting the control message, third-party server-side plug-in 316 may create the plug-in X-header comprising the encrypted control message. As may be understood, the plug-in X-header may be custom headers that allow mail server 302 (or by a component therein, such as third-party server-side plug-in 316) to include data, for example, the encrypted control message (that can be interpreted by third-party email client plug-in 322 to recognize the instructions included in the control message).

Step 910 includes injecting the plug-in X-header into an SMTP message. In an implementation, third-party server-side plug-in 316 may inject the plug-in X-header into an SMTP message. In an example, third-party server-side plug-in 316 may inject the plug-in X-header in the SMTP message via API and/or via other known header injection techniques.

Although, techniques are provided for enabling communication between third-party application server 306 and third-party email client plug-in 322 for email client 304 installed in a client device, the techniques can also be applied on plug-ins for email clients accessed through browser (including operation during offline scenarios where the required content/instructions are downloaded to client device when browser accessed email client 304 is online). Further, the techniques can also be applied on plug-ins in browser or other areas where plug-ins are used as appropriately.

What is claimed is:

1. A method comprising:
identifying, by a server of a third party, one or more instructions to control a plug-in of the third party installed on an email client of an entity, the server configured to communicate with an email system of the entity;
generating, by the server, a control message comprising the one or more instructions;
encrypting, by the server, the control message with a key shared with the plug-in; and
communicating, by the server, the encrypted control message to the email system to cause the email system to communicate an email having the encrypted control message to the email client to be processed by the plug-in.

2. The method of claim 1, further comprising communicating, by the server, the key from a key pair to the plug-in.

3. The method of claim 1, further comprising including, by the server, the encrypted control message in a dedicated email and sending the dedicated email to the email system.

4. The method of claim 1, wherein the plug-in decrypts the encrypted control message from the email using the key.

5. The method of claim 1, wherein the one or more instructions comprises a pointer to one or more messages in a storage.

6. The method of claim 1, wherein the one or more instructions comprises a lookup element on the server of the third-party.

7. The method of claim 1, wherein the one or more instructions instruct the plug-in to retrieve one of content or an executable from the server of the third party.

8. The method of claim 1, wherein the email comprises the encrypted control message in a plug-in header of the email.

9. The method of claim 1, wherein the server is further configured to provide instructions to the email system to inject the encrypted control message into a plug-in header of the email and communicate the email to the email client.

10. The method of claim 1, wherein the plug-in is configured to perform one or more actions responsive to the one or more instructions from the encrypted control message.

11. A system comprising:
a server of a third party, the server configured to:
identify one or more instructions to control a plug-in of the third party installed on an email client of an entity, the server configured to communicate with an email system of the entity;

generate a control message comprising the one or more instructions;

encrypt the control message with a key shared with the plug-in; and communicate the encrypted control message to the email system to cause the email system to communicate an email having the encrypted control message to the email client to be processed by the plug-in.

12. The system of claim 11, wherein the server is further configured to communicate the key from a key pair to the plug-in.

13. The system of claim 11, wherein the server is further configured to include the encrypted control message in a dedicated email and sending the dedicated email to the email system.

14. The system of claim 11, wherein the plug-in decrypts the encrypted control message from the email using the key.

15. The system of claim 11, wherein the one or more instructions comprises a pointer to one or more messages in a storage.

16. The system of claim 11, wherein the one or more instructions comprises a lookup element on the server of the third-party.

17. The system of claim 11, wherein the one or more instructions instruct the plug-in to retrieve one of content or an executable from the server of the third party.

18. The system of claim 11, wherein the email comprises the encrypted control message in a plug-in header of the email.

19. The system of claim 11, wherein the server is further configured to provide instructions to the email system to inject the encrypted control message into a plug-in header of the email and communicate the email to the email client.

20. The system of claim 11, wherein the plug-in is further configured to perform one or more actions responsive to the one or more instructions from the encrypted control message.

* * * * *